United States Patent
Bogle et al.

(10) Patent No.: US 12,359,943 B1
(45) Date of Patent: Jul. 15, 2025

(54) SYSTEM, APPARATUS AND METHODS FOR ESTIMATING THE AMOUNT OF NUTRIENTS RELEASED FROM ENVIRONMENTALLY-FRIENDLY WEAR MATERIAL

(71) Applicant: GrndUp LLC, Denver, CO (US)

(72) Inventors: Thomas Besford Bogle, Bozeman, MT (US); Eugene F. Kelly, Boulder, CO (US)

(73) Assignee: GrndUp LLC, Denver, CO (US)

( * ) Notice: Subject to any disclaimer, the term of this patent is extended or adjusted under 35 U.S.C. 154(b) by 365 days.

(21) Appl. No.: 17/901,608

(22) Filed: Sep. 1, 2022

Related U.S. Application Data

(60) Provisional application No. 63/241,949, filed on Sep. 8, 2021.

(51) Int. Cl.
| | | |
|---|---|---|
| *G01D 7/00* | (2006.01) | |
| *A43B 3/44* | (2022.01) | |
| *B60C 11/24* | (2006.01) | |
| *A43B 13/12* | (2006.01) | |
| *B60C 11/16* | (2006.01) | |

(52) U.S. Cl.
CPC ............... *G01D 7/00* (2013.01); *A43B 3/44* (2022.01); *B60C 11/24* (2013.01); *A43B 13/12* (2013.01); *B60C 11/1625* (2013.01); *G01D 7/005* (2013.01)

(58) Field of Classification Search
USPC .......................................................... 702/34
See application file for complete search history.

(56) References Cited

U.S. PATENT DOCUMENTS

| | | |
|---|---|---|
| 6,578,291 B2 | 6/2003 | Hirsch et al. |
| 6,883,567 B2 * | 4/2005 | Shimura ................ B60C 11/24 |
| | | 152/DIG. 3 |
| 6,922,916 B1 | 8/2005 | Potter |
| 7,353,770 B2 | 4/2008 | Sanguinetti |
| 10,821,783 B2 | 11/2020 | Schimmoeller et al. |
| 10,994,521 B2 | 5/2021 | Hodjat et al. |
| 2002/0078598 A1 | 6/2002 | Bell |
| 2008/0168833 A1 | 7/2008 | Awad |

(Continued)

FOREIGN PATENT DOCUMENTS

| | | |
|---|---|---|
| CN | 102837566 A | 12/2012 |
| GB | 2411336 A | 8/2005 |

(Continued)

OTHER PUBLICATIONS

Schallamach, A. "Friction and abrasion of rubber." Wear 1.5 (1958): 384-417.

(Continued)

*Primary Examiner* — Paul D Lee
(74) *Attorney, Agent, or Firm* — Michael Best & Friedrich LLP

(57) ABSTRACT

System, apparatus, articles of manufacture and methods useful for determining an approximate amount of one or more ingredients of wear material released from the wear portion of an item that wears during use of the item involve the use of a material release tracker that is associated with the wear portion and which can be used to estimate the amount of one or more ingredients released from the wear portion.

21 Claims, 12 Drawing Sheets

(56) References Cited

U.S. PATENT DOCUMENTS

| | | | |
|---|---|---|---|
| 2009/0114322 A1* | 5/2009 | O'Brien | B29D 30/66 |
| | | | 156/244.18 |
| 2011/0126949 A1* | 6/2011 | Cuny | B60C 11/24 |
| | | | 425/173 |
| 2012/0049610 A1 | 3/2012 | Lew | |
| 2016/0219972 A1 | 8/2016 | Davies | |
| 2017/0258173 A1 | 9/2017 | Johnson | |

FOREIGN PATENT DOCUMENTS

| | | |
|---|---|---|
| WO | 2006098840 A2 | 9/2006 |
| WO | 2016122069 A1 | 8/2016 |

OTHER PUBLICATIONS

Fukahori, Y. et al. "Mechanism of rubber abrasion. Part I: Abrasion pattern formation in natural rubber vulcanizate." Wear 171.1-2 (1994): 195-202.

Doctors of Running. Footwear Science: Outsole Wear Patterns. Webpage. Jun. 2017. Version dated Jul. 31, 2021. Available online at https://www.doctorsofrunning.com/2017/06/footwear-science-outsole-wear-patterns.html (8 pages).

* cited by examiner

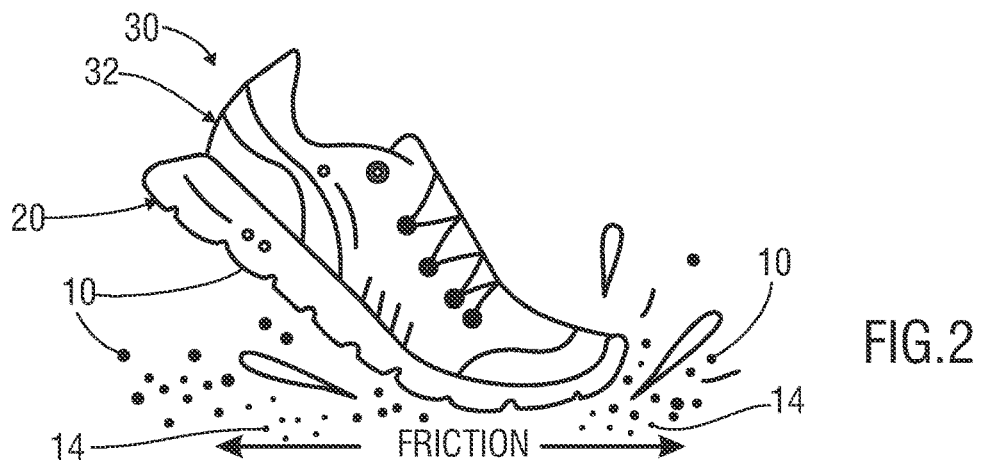
FIG. 2
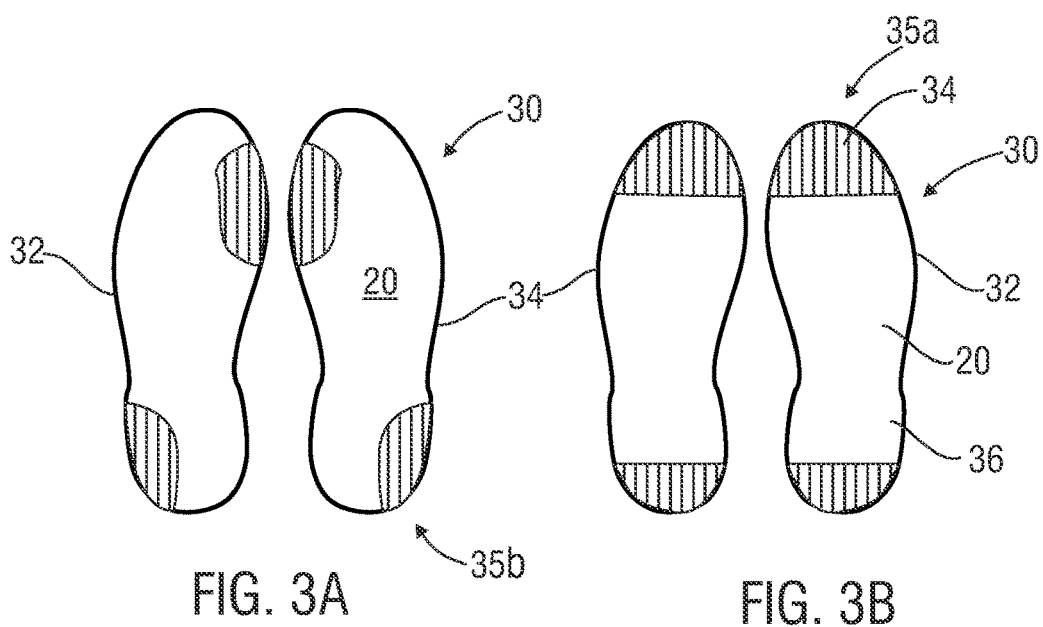
FIG. 3A   FIG. 3B
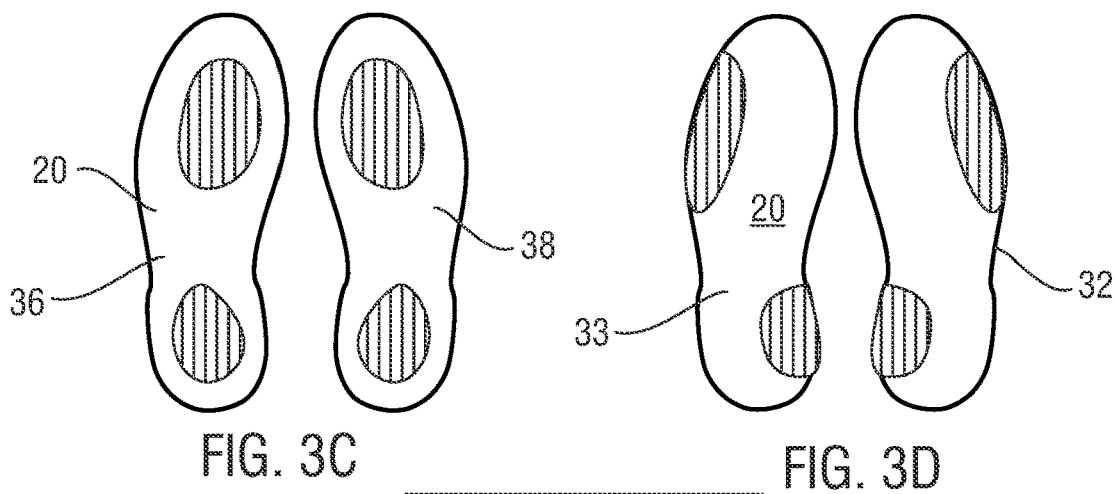
FIG. 3C   FIG. 3D
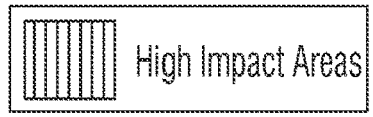

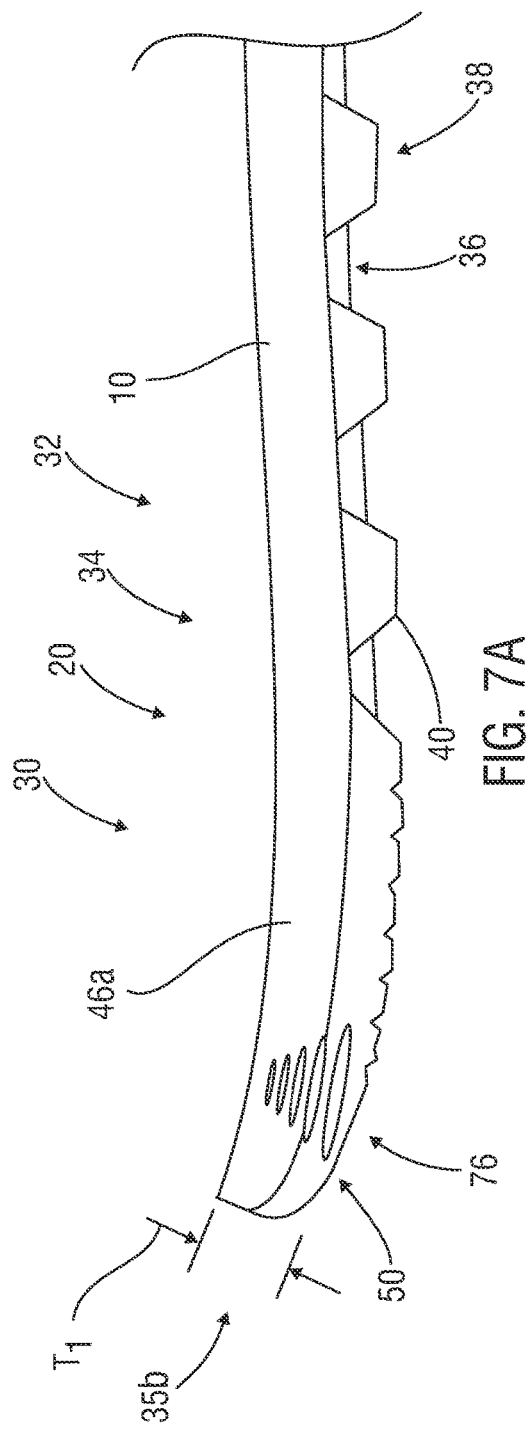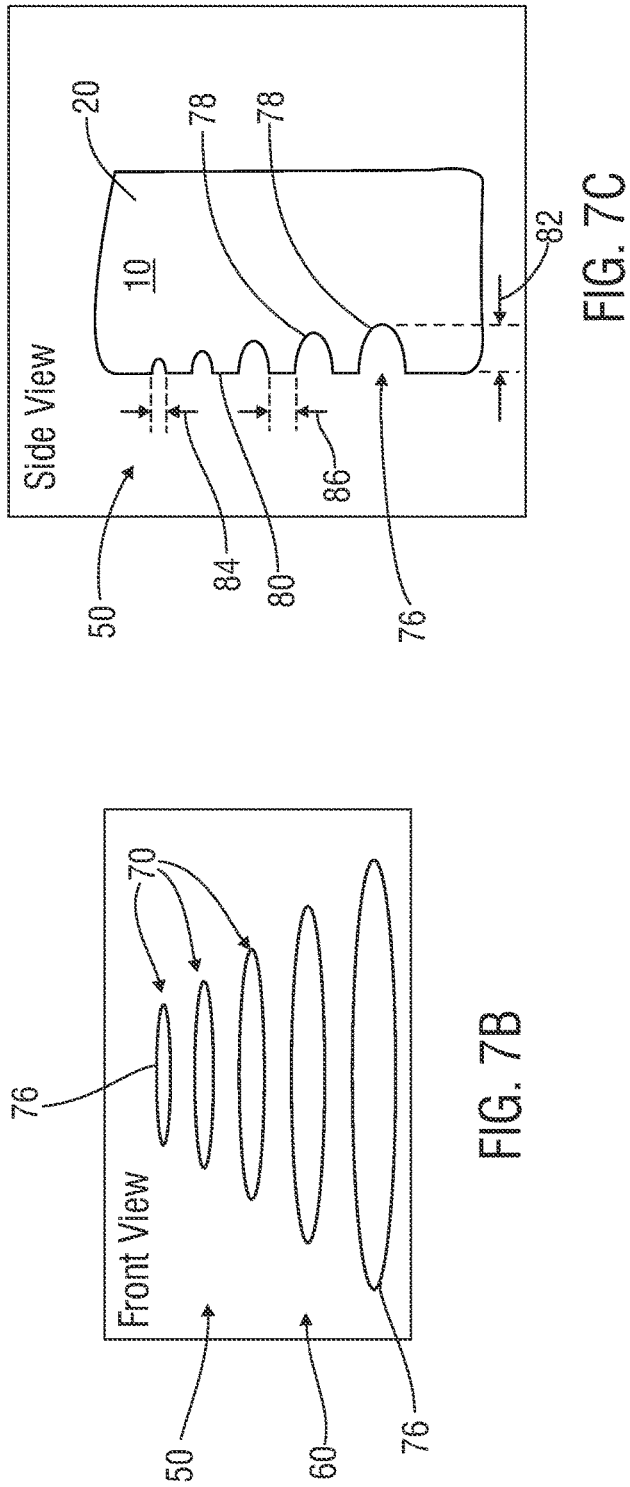

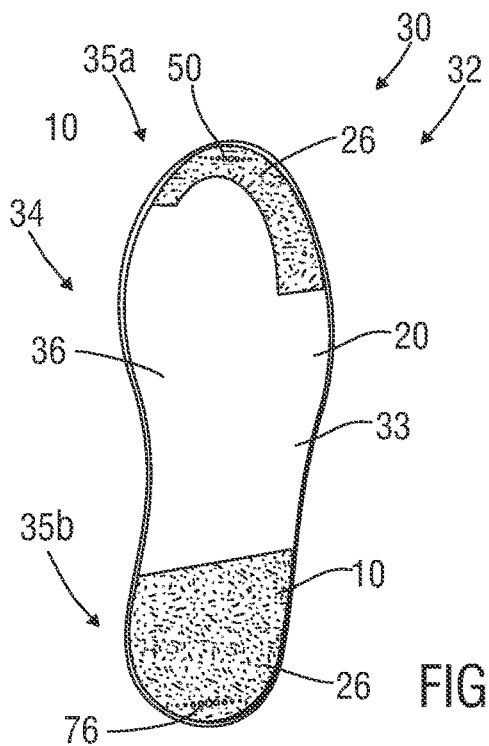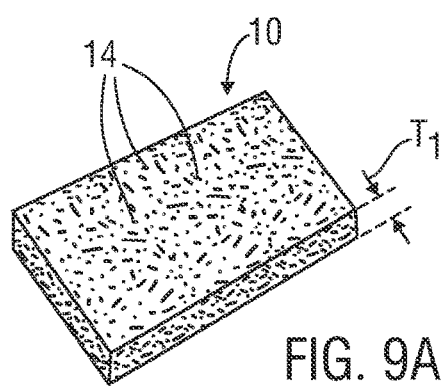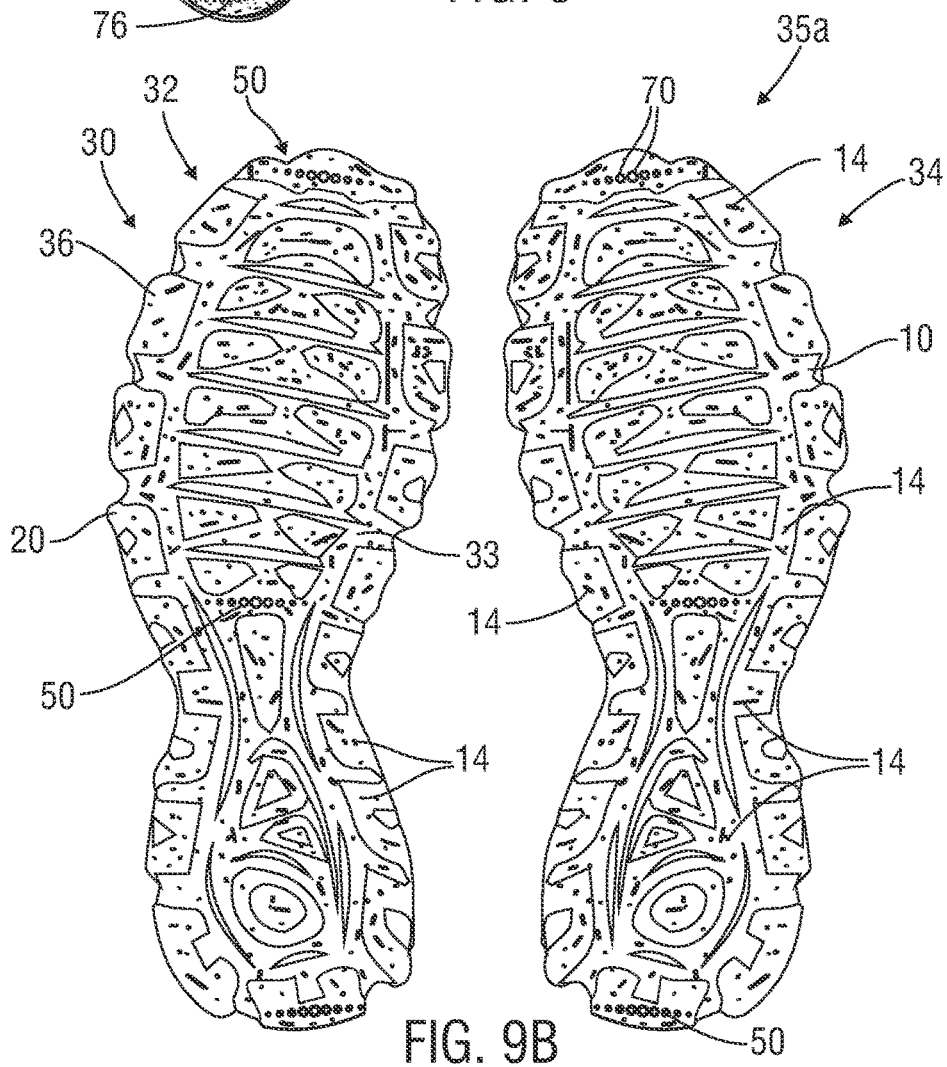

| Legend | |
|---|---|
| ▨▨▨ MATERIAL LOSS | ----- NEW OUTER SURFACE |

SYSTEM, APPARATUS AND METHODS FOR ESTIMATING THE AMOUNT OF NUTRIENTS RELEASED FROM ENVIRONMENTALLY-FRIENDLY WEAR MATERIAL

CROSS REFERENCE TO RELATED APPLICATIONS

The present application claims priority to U.S. Provisional Patent Application Ser. No. 63/241,949 filed on Sep. 8, 2021 and entitled "Regenerative Wear Material & Apparatus, Systems & Methods for Indicating & Evaluating Wear on an Item or Component thereof & Determining the Weight, Volume, Nutrient Output and/or Other Characteristic(s) of Shedded Material from Such Wear", the entire contents of which are hereby incorporated by reference herein.

FIELD OF THE DISCLOSURE

The present disclosure relates generally to systems, apparatus, articles of manufacture and methods involving wear material used on the wear portions of items, and in some embodiments, systems, apparatus, articles of manufacture and methods for measuring, estimating and/or tracking the release of ingredients from the wear material due to use of the item.

BACKGROUND

Over most of Earth's land lies a relatively thin layer of biologically active soil-a complex and variable mixture of minerals, air, water, decaying remains of life and countless living organisms, referred to herein as the "topsoil". Earth's topsoil is believed to be deeply connected to life on the planet. When topsoil is healthy and in abundance, for example, it effectively pulls and safely stores water and $CO_2$ from the atmosphere, allowing life forms to grow and regenerate. When topsoil is unhealthy or degraded, it can erode, release water and $CO_2$ into the atmosphere, causing desertification and a loss of life. Topsoil is thus believed to be a centerpiece to the continued existence of life on Earth.

For the past half century or so, it is believed that degradation (via erosive loss and nutrient depletion) of Earth's topsoil has, among other things, impacted climate change and loss of biodiversity and life. For example, terrestrial ecosystems store massive amounts of nutrients (in biomass and soils) that are critical for sustaining the biogeochemistry of the planet. During plant growth, soil nutrients are up-taken, or absorbed, into the body of the plant, where simple compounds are modified and converted into other compounds or joined to form macromolecules as a result of biosynthetic processes. Agriculture disrupts the recycling of nutrients between soils and plants and back again, because instead of letting the nutrients return to the soil at the end of the season, they are removed by harvest. Accordingly, while large-scale commercial agricultural practices used to grow food extract nutrients from the topsoil, they do not fully restore the nutrients after the crops mine or withdraw the nutrients out of the ground. Decades of these practices are believed to have caused a nutrient depletion of Earth's topsoil. Some consequences of this soil degradation are believed to be mass erosion events (e.g., landslides, floods), increased point source and nonpoint source pollution and the release of greenhouse gases, desertification, decreased biodiversity and a decline in the global food supply.

Under the Law of Return, or "replacing what was removed", to repair the loss or degradation of topsoil, ingredients of topsoil would need to be added back. When topsoil is restored and enhanced, it is believed to create positive impacts across the ecosystem, including enhanced carbon storage, improving watershed integrity, increased soil biodiversity, reducing erosion, etc. The science of helping "regenerate" soil includes inputting organic (largely carbon-based) materials into the topsoil, such as plant and/or animal derived organic waste, and replacing inorganic materials (e.g., minerals) that are removed from the soil during plant growth and soil formation. In mimicking processes in nature, humans can employ regenerative practices, for example, to promote critical soil functions (e.g. storing of nutrients), which can help mitigate impacts of climate change and foster a healthier planet. For example, recycling and repurposing agricultural waste can play an important role in preserving the planet. Another way to help prevent harm to the ecosystem is to reduce the production and use of products and materials that become harmful waste in the first place.

Various products and other items include one or more portions, or components, having rubber, plastic or other materials that shed, or wear off, during use, such as from abrasion or friction. For example, the wear portions may be the part of an item that grips and/or contacts the ground or other surfaces during use and, as a result, sheds or wears off via abrasion-type wear. Shedding may occur when friction wears, grinds or rubs away at the wear portion (sometimes referred to as abrasion), resulting in the removal or loss of wear material therefrom. The shedded material is no longer attached to the item and may become free floating and dispersed into the environment (e.g., where it may become biologically available). In some cases, individual particles of shedded wear material may be less than approximately 5 um (microns) in size; however, their size can vary depending on a variety of factors.

During use of shoes having a wear portion constructed at least partially of elastomeric material, for example, as pressure is transferred from the wear material to the ground, for example, frictional force can be applied between the ground surface and wear portion, generating material abrasion and causing the loss of wear material. Under various mild abrasion conditions, chemical changes in the elastomer can be important and wear can be mostly due to mechanochemical degradation initiated by shear-induced rupture of chemical bonds, i.e., free radical generation. In more harsh abrasion conditions, wear can be related to tearing, or crack growth resistance, of the elastomeric material. Other background and general information about abrasive wear to wear material can be found, for example, at https://www.intechopen.com/chapters/38887, https://www.sciencedirect.com/science/article/abs/pii/0043164858901133 and https://www.sciencedirect.com/science/article/abs/pii/004316489490362X, the entire contents of which are hereby incorporated by reference herein. Certain excerpts from these sources can be found in in the priority application for this patent, U.S. Provisional Patent Application Ser. No. 63/241,949 (particularly in Exhibit "A" thereto), which is referenced above and incorporated by reference herein. However, this patent is not limited in any way by, or to, any of the contents of these references.

Various presently known wear materials contain ingredients that, when shedded, are not regenerative and, in fact, can have a detrimental or damaging impact on the environment and plant and animal life. For example, when the wear material sheds off the wear portion of typical presently available shoes, tires and other items, toxic micro-fragments of the components in the wear portion, such as heavy metals, teratogens and carcinogens, are often present in the shedded material. These toxins can seep into the earth and run, or wash-off, into the surrounding ecosystem (e.g., after rainfall) and may, among other things, reduce the oxidizing properties of cells and inhibit fertility in both plants and animals. A chemical footprint of these toxins may be detectable in rivers, oceans and other bodies of water, soil and animal and plant-life.

It is also believed that no widely known technology or methodology exists for tracking, or quantifying, the amount of wear material shedded from a product, or other item, due to wear, or the amount of any ingredients (e.g., environmentally-friendly components) released therefrom.

It should be understood that the above-described features, capabilities, examples, disadvantages, limitations and other details are provided for illustrative purposes only and are not intended to limit the scope or subject matter of this disclosure or the appended claims. Thus, none of the appended claims should be limited by the above discussion or construed to address, include or exclude each or any of the above-cited features, capabilities, examples, disadvantages and limitations merely because of the mention thereof above or herein.

Accordingly, there exists a need for improved systems, apparatus, articles of manufacture and methods useful in connection with the design, manufacture, construction, use and/or tracking of wear material used in the wear portions of items.

BRIEF SUMMARY OF THE DISCLOSURE

In some embodiments, the present disclosure involves systems for determining an approximate amount of nutrients released from the wear portion of an item that abrades due to friction during use of the item. The system includes regenerative wear material provided in the wear portion of the item, the regenerative wear material including nutrients. One or more material release trackers are associated with the wear portion and configured to provide "material release information" during use of the item based upon wear to the wear portion The material release information may be useful to estimate the amount of nutrients released from the wear portion of the item.

If desired, the material release tracker may be provided in the item and the material release information may include a visible configuration of material discharge features associated with the wear portion of the item. The visible configuration of material discharge features may be configured to change at different times based upon wear to the wear portion. Each different configuration may correspond with a different estimated amount of nutrients released from the wear portion. If desired, the system may include a non-transitory computer readable medium comprising computer readable code executable by one or more processors to read the material release tracker and determine and present the estimated amount of nutrients output from the wear portion of the item based upon the material release tracker.

One or more material release converters may be configured to provide the estimated amount of nutrients released from the wear portion of the item based upon material release information from the material release tracker(s). If desired, the material release converter may be integral with the item or material release tracker, or provided in, or on, the item. In some instances, the material release converter can be provided in computer software.

The item and its wear portions may take any form. For example, the item may be a shoe and the outsole may be the wear portion. For other examples, the item may be a wheel, ski pole or handlebar of a bicycle or motorcycle, the wear portions being the tire of the wheel, traction pad or grip of the ski pole and grip of the handlebar, respectively. In some instances, at least two material release trackers may be provided at different respective locations in the item and the estimated amount of nutrients output from the wear portion of the item may be based upon an average of material release information from one or more of the material release trackers.

The present disclosure also includes embodiments of systems for determining an approximate total amount of nutrients output from the wear portion of an item at different times during use of the item based upon wear to the wear portion, where the wear portion is constructed of regenerative wear material that includes nutrients. The system includes at least one material release tracker provided in the item and associated with the wear portion and at least one material release converter. The material release converter includes an estimated total amount of nutrients output from the wear portion of the item corresponding to an estimated amount of wear to the wear portion and based upon the material release tracker.

In some embodiments, the material release tracker may include a detectable configuration of material discharge features associated with the wear portion of the item. The detectable configuration may change at different times during at least part of the life of the item based upon wear to the wear portion, each different configuration corresponding with a different estimated total amount of regenerative wear material discharged from wear portion. The material release converter may be configured to provide a different estimated total amount of nutrients released from the wear portion for each different configuration of material discharge features.

In some cases, the material release converter may be provided in a non-transitory computer readable medium comprising computer readable code executable by one or more processors to determine the corresponding estimated total amount of nutrients released from the wear portion of the item based upon the detectable configuration. If desired, at least one among the material release tracker and material release converter may be software-driven.

The wear portion of the item may have a thickness that decreases during wear and the material release tracker may include a plurality of differing material discharge features, each material discharge feature being associated with a different thickness of the wear portion. In some instances, the wear portion of the item includes a wear face and the material discharge features include multiple different-sized cavities extending inwardly into the wear portion from the wear face. Each different-sized cavity may include a base provided at a different respective depth in the wear portion that corresponds with a distinct approximate total amount of regenerative wear material discharged from the wear portion at one or more points in time during use of the item.

If desired, the material release converter may include a distinct estimated total amount of nutrients output from the wear portion corresponding to the depth of each respective different-sized cavity. After each respective different-sized cavity disappears or is worn down to the base thereof, the material release converter may provide a different estimated total amount of nutrients released from the wear portion. In some cases, for example, the depth of a first cavity may be less than the depth of a second adjacent cavity, which is less than the depth of a third adjacent cavity. The first, second and third cavities may be provided in a visible configuration that will change over time due to wear to the wear portion. A different estimated total amount of nutrients output from the wear portion may correspond with each among a plurality of different variations of the visible configuration of the first, second and third cavities. For example, a first variation of the visible configuration may include the second and third cavities, a second variation of the visible configuration may include only the third cavity and a third variation of the visible configuration may include no cavities. The first variation of the visible configuration may correspond with a first estimated total amount of nutrients released from the wear portion (based upon the depth of the first cavity), the second variation of the visible configuration may correspond with a second estimated total amount of nutrients output from the wear portion (based upon the depth of the second cavity) and the third variation of the visible configuration may correspond with a third estimated total amount of nutrients released from the wear portion (based upon the depth of the third cavity), where the first, second and third estimated total amounts of nutrients released each differ from one another.

In some embodiments, the present disclosure involves methods of determining an approximate amount of nutrients released from the wear portion of an item at different times during the life of the item based upon wear to the wear portion. These exemplary methods involve the use of at least one material release tracker having a visible configuration of multiple material discharge features associated with the wear portion, which includes nutrients. The material release tracker displays a first variation of the visible configuration of material discharge features at a first point in time during the life of the item and a second variation of the visible configuration of material discharge features at a second respective point in time. A first estimated total amount of nutrients output from the wear portion of the item is provided based upon the first variation of the visible configuration of material discharge features and a respective second estimated total amount of nutrients output from the wear portion of the item is provided based upon the second variation of the visible configuration of material discharge features. The second point in time is chronologically after the first point in time and the second estimated total amount of nutrients output from the wear portion is greater than the first estimated total amount of nutrients output.

Accordingly, the present disclosure includes features and advantages which are believed to enable it to advance wear material technology. Characteristics and advantages of the present disclosure described above and additional features and benefits will be readily apparent to those skilled in the art upon consideration of the following detailed description of various embodiments and referring to the accompanying drawings.

BRIEF DESCRIPTION OF THE DRAWINGS

The following figures are part of the present specification, included to demonstrate certain aspects of various embodiments of this disclosure and referenced in the detailed description herein:

FIG. 2 is a side view of an exemplary shoe shown shedding particles of wear material during use thereof;

FIG. 3A is a first exemplary set of high impact areas on the outsoles of a pair of shoes;

FIG. 3B is a second exemplary set of high impact areas on the outsoles of a pair of shoes;

FIG. 3C is a third exemplary set of high impact areas on the outsoles of a pair of shoes;

FIG. 3D is a fourth exemplary set of high impact areas on the outsoles of a pair of shoes;

FIG. 7A is a side view of part of a shoe outsole constructed of exemplary regenerative wear material and bearing an exemplary material release tracker on a side wall thereof in accordance with one or more embodiments of the present disclosure;

FIG. 7B is a front isolated view of the material release tracker shown in FIG. 7A;

FIG. 7C is a side isolated view of the exemplary material release tracker shown in FIG. 7A looking down the sidewall from the rear end of the shoe and provides some exemplary dimensions of the illustrated depth gauges;

FIG. 8 is a bottom view of an item including a pair of inlays, or traction pads, made with exemplary regenerative wear material in accordance with one or more embodiments of the present disclosure;

FIG. 9A is an exemplary piece of a wear material constructed of exemplary speckled regenerative wear material in accordance with one or more embodiments of the present disclosure;

FIG. 9B is an exemplary pair of shoes having wear portions construed of the wear material shown in FIG. 9A;

DETAILED DESCRIPTION OF EXEMPLARY EMBODIMENTS

Figure 1A:
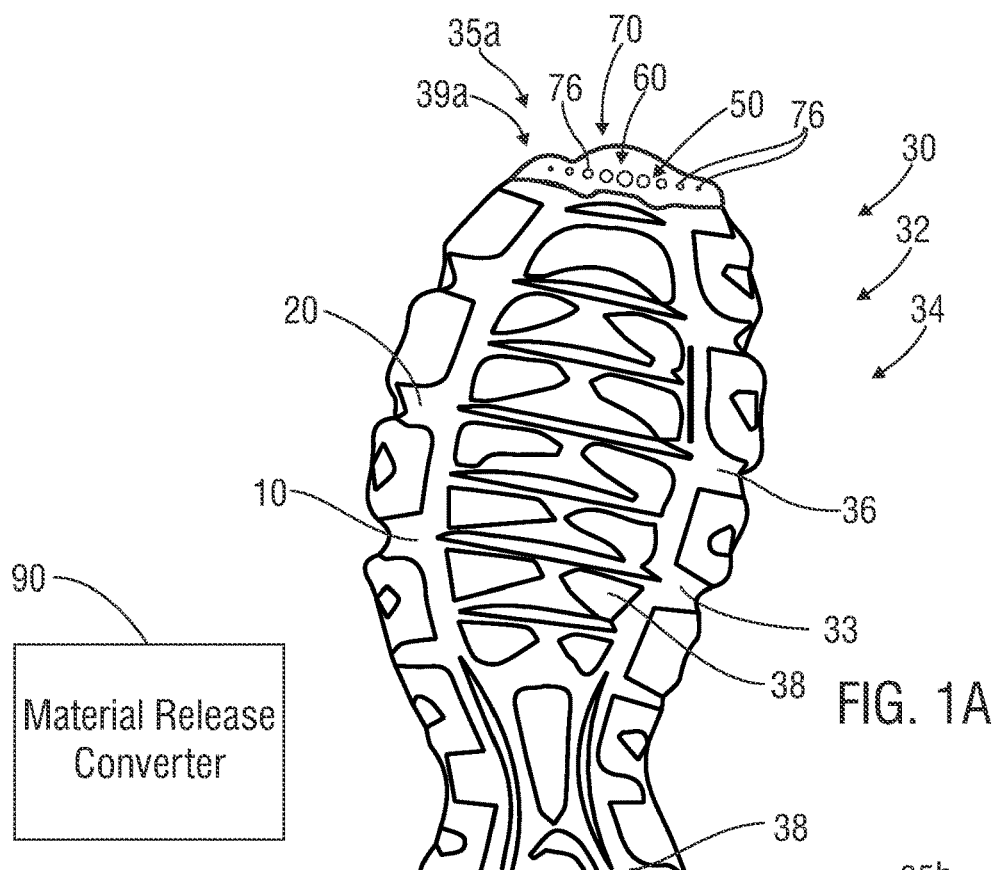
FIG. 1A is a bottom view of an exemplary pair of shoes that include exemplary regenerative wear material and material release trackers in accordance with one or more embodiments of the present disclosure.

Characteristics and advantages of the present disclosure and additional features and benefits will be readily apparent to those skilled in the art upon consideration of the following detailed description of exemplary embodiments and referring to the accompanying figures. It should be understood that the description herein and appended drawings, being of exemplary embodiments, are not intended to limit the claims of this patent (or any patent or patent application claiming priority hereto). On the contrary, the intention is to cover all modifications, equivalents and alternatives falling within the spirit and scope of this disclosure and the claims. Many changes may be made to the particular embodiments and details disclosed herein without departing from such spirit and scope.

In showing and describing preferred embodiments in the appended figures, common or similar components, features and elements are referenced with like or identical reference numerals or are apparent from the figures and/or the description herein. The figures are not necessarily to scale and certain features and certain views of the figures may be shown exaggerated in scale or in schematic in the interest of clarity and conciseness.

When reference numbers are followed by a lowercase letter (e.g., connectors 110a, 110b), they are each the same type of component or item (e.g., a connector 110) having the same features, but having a different location, use or other characteristic(s). Parenthetical phrases starting with "e.g.", such as (e.g., tool string), are meant to provide one possible example of the referenced feature or circumstance that may occur in some instances. Such examples are not required for every embodiment or any claims, except and only the extent as may be explicitly provided otherwise.

As used herein and throughout various portions (and headings) of this patent (including the claims), the terms "invention", "present invention" and variations thereof are not intended to mean every possible embodiment encompassed by this disclosure or any particular claim(s). Thus, the subject matter of each such reference should not be considered as necessary for, or part of, every embodiment hereof or of any particular claim(s) merely because of such reference.

Certain terms are used herein and in the appended claims to refer to particular features and components. As one skilled in the art will appreciate, different persons may refer to a feature or component by different names and this document does not intend to distinguish between components and features that differ in name but not function. Also, the terms "including" and "comprising" are used herein and in the appended claims in an open-ended fashion, and thus should be interpreted to mean "including, but not limited to . . . ".

Reference herein and in the appended claims to components, features and aspects in a singular tense does not necessarily limit the present disclosure or appended claims to only one such component, feature or aspect, but should be interpreted generally to mean one or more, except and only to the extent as may be expressly specified otherwise herein or in any particular claims hereof and only for such specific references or claims and other claims depending therefrom. The use of "(s)" in reference to an item, aspect, component, feature or action (e.g., "surface(s)") should be construed to mean "at least one".

The term "and/or" as used herein provides for three distinct possibilities: one, the other or both. All three possibilities do not need to be available—only any one of the three. For example, if an embodiment of a component is described as "having a collar and/or a coupling", it may include only one or more collars, only one or more couplings or at least one of each. Thus, the use of "and/or" herein does not require all three possibilities, just any one or more of the three possibilities. A claim limitation that recites "having a collar and/or a coupling" would be literally infringed by a device including only one or more collars, one or more couplings or both one or more couplings and one or more collars. The phrase "at least one among" has the same meaning as "and/or". For example, if an embodiment of a component is described as "having at least one among a collar, a coupling and a connector", it may include only one or more collars, only one or more couplings, only one or more connectors or any combination thereof. Thus, the use of "at least one among" herein and in any claims related hereto does not require all those possibilities to be available, just any one or more of them. Thus, a claim limitation that recites "having at least one among a collar, a coupling and a connector" would be literally infringed by a device including only one or more collars, one or more couplings, one or more connectors or any combination thereof.

As used throughout this patent, the following terms have the following meanings, except and only to the extent as may be expressly specified otherwise:

The terms "amount" and variations thereof refer to and include quantity, volume, thickness, weight, level, mass or any other measure or characteristic of size.

The terms "cavity" and variations thereof refer to and include one or more indentations, cut-outs, depressions, channels, pockets, hollows, sockets, gaps, apertures, concave features, troughs, trenches or other spaces formed or provided in, or on, an item, which can be empty or not empty and have any shape. Moreover, the form, nature, configuration and other characteristics of the cavity are not limiting upon the present disclosure, except and only to the extent as may be expressly specified otherwise in any particular claims hereof and only for such claims and other claims depending therefrom.

The terms "coupled", "connected", "engaged" and the like, and variations thereof refer to and include either an indirect or direct connection or engagement. Thus, if a first device couples to a second device, that connection may be through a direct connection, or through an indirect connection via other devices and/or connections, except and only to the extent as may be expressly specified otherwise herein or in any particular claims hereof and only for such specific references or claims and other claims depending therefrom.

The terms "elongated" and variations thereof as used herein mean and refer to an item having an overall length (during the intended use of the item) that is greater than its average width.

The terms "environment" and "ecosystem" and used interchangeably herein to generally encompass Earth and its organisms (all the biological communities of interacting organisms and their physical environments on the planet).

The terms "item" and variations thereof refer to and include anything having one or more wear portions, such as, without limitation tires (e.g., automobiles, motorcycles, 4-wheelers, off-terrain vehicles and other vehicles, tractors and other farm equipment, wheelchairs and other medical equipment, golf carts, bicycles, tricycles, unicycles, mountain bikes, micro-mobility equipment (e.g., e-bikes, travel boards, scooters, golf carts, one-wheels)); athletic equipment (e.g., waders, swim goggles, flippers, wet suits and other swimwear and aquatic equipment, camping and fishing equipment, hiking equipment, rock climbing equipment, rappelling equipment, snow sports equipment); shoes and other wearable items (e.g., gloves, head and face coverings, eyewear); furniture, lawn and garden equipment; electronic equipment (e.g., phones, tablets, watches) and accessories therefor (e.g., cases, carriers); grips (e.g., on handlebars, fishing poles, canes, walkers, wheelchairs, hiking, trekking and ski poles, firearms, bows, selfie-sticks, umbrellas); protective stands, tractions pads, bases, grommets and the like (e.g., on coolers, camera tri-pods, mats (i.e., restaurant kitchen, yoga, golf), canes, walkers, trekking/ski poles, mugs, thermos, canteens, lawn chairs, camp chairs, collapsible chairs, selfie-sticks); ropes, chains and the like; military equipment; storage containers; shipping containers, devices and equipment; heavy equipment and vehicles; components of machines and vehicle (e.g., aircraft, waterborne vessels, industrial machines and systems) having one or more components with elastic or plastic properties; industrial mats and other ground covers; any other products or items or any combination thereof.

The terms "party", "user", "entity", "person", "OEM", "vendor" and the like refer to and include one or more humans, legal entities, virtual entities, beings and avatars, robots and robotic components, artificial intelligence-driven components/circuitry, other entities, components and the like.

The terms "rigidly coupled" and variations thereof mean connected together in a manner that is intended not to allow any, or more than an insubstantial or minimal amount of, relative movement therebetween as is expected during typical or expected operations. In other words, if components A and B are rigidly coupled together, they are not movable relative to one another (more than a minimal or insubstantial amount) during typical or expected operations.

The terms "shoe(s)", "footwear" and variations thereof refer to and include any type of foot covering having one or more wear portions, including without limitation, dress shoes, boots, sandals, flip flops, clogs, slippers, sneakers and athletic footwear (cleats, water shoes, roller blades and skates, skateboarding shoes, ski boots, waders and other hunting and fishing footwear), medical shoes and devices (e.g., diabetic shoes, medical boots), and the like.

The terms "wear material" and variations thereof refer to and include rubber, plastic, polymers, natural material (e.g., cork), metal and any other material or substance that can abrade upon contact with the ground or any other surface or items, or shed particles from abrasion. Wear material can be made synthetically and/or from natural sources. Non-limiting examples of wear material include polymeric, elastomeric, thermoplastic and elastic materials and substances and other materials and substances having elastic or plastic properties.

The terms "wear portion" and variations thereof refer to and include one or more portions of an item that include wear material.

It should be noted that any of the above terms may be further explained, defined, expanded or limited below or in other parts of this patent. Further, the above list of terms is not all inclusive, and other terms may be defined or explained below or in other sections of this patent.

Figure 1B:
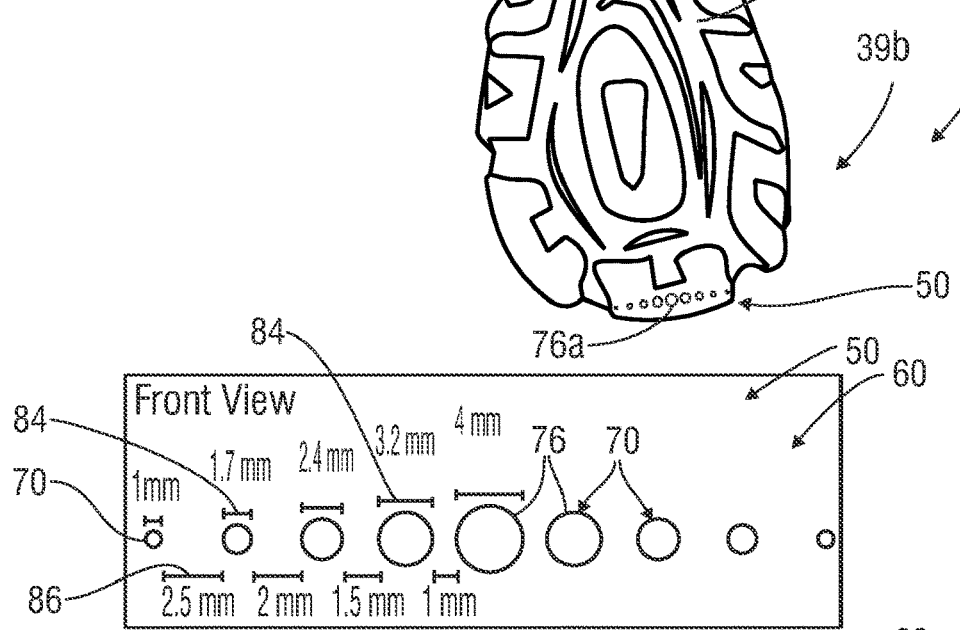
FIG. 1B is a front isolated view of the foremost material release trackers of FIG. 1A and provides some exemplary dimensions of the illustrated depth gauges.
Figure 1C:
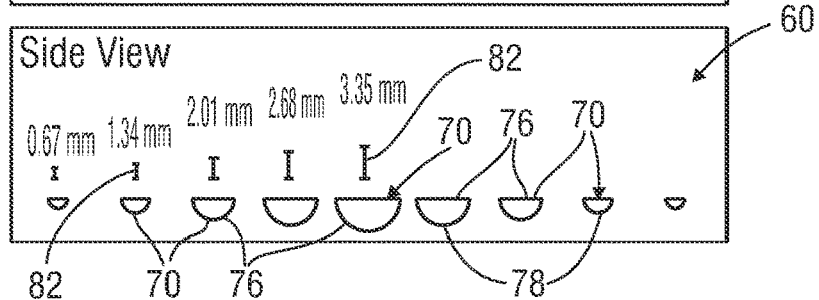
FIG. 1C is a side isolated view of the foremost material release tracker shown in FIG. 1A looking from the front end of the shoe and provides some exemplary dimensions of the illustrated depth gauges.

Referring initially to FIGS. 1A-C, in one independent innovative aspect, the present disclosure includes embodiments of regenerative wear material 10 that contains environmentally-friendly ingredients and can be used for at least partially forming the wear portions 20 of items 30. As used herein, the terms "regenerative" and variations thereof refer to and include having one or more properties that can help renew and/or restore soil or other earthen materials, substances or formations, help renew, restore, improve, or cause the natural growth of plant and/or animal cells, organisms, biological systems or ecosystems, reverse or counter the degeneration of any of the above, or a combination thereof. The regenerative wear material 10 may have any suitable form, configuration, composition, ingredients, construction and other characteristics. For example, the environmentally-friendly ingredients of the regenerative wear material 10 may include "nutrients."

As used herein, the terms "nutrient" and variations thereof refer to an include one or more organic and/or inorganic substances (e.g., solids, liquid, gases, etc.) derived from plant matter and/or plant bi-products, soil matter and/or soil bi-products, animal matter or animal by-products or any combination thereof. The nutrients may, in some instances, include plant-based matter, organic ingredients, inorganic ingredients or a combination thereof. The plant-based matter may, for example, include naturally grown latex, such as Amazonian rubber (*Hevea brasiliensis*) and other members of the spurge family (*Euphorbia*), rubber fig (*Ficus elastica*), Panama rubber tree (*Castilla elastica*), lettuce (*Lactuca* species), the related *Scorzonera tau-saghyz*), various *Taraxacum* species such as common dandelion (*Taraxacum officinale*) and Russian dandelion, and guayule (*Parthenium argentatum*). Examples of organically-derived ingredients that may be included as nutrients are organosulfur, beeswax and other biomineralized materials. Other examples of nutrients may include, but are not limited to, cellulose, hemicellulose, lignocellulosic biomass, clays, biogenic silica, soil minerals, oxalates, and other organic and inorganic matter naturally found in soils.

In some cases, the regenerative wear material 10 may be constructed of at least 90% nutrients (or more or less), include 50-70% natural rubber (or more or less), include at least 20% (or more or less) of plant-biproduct or waste matter leftover from processing, not include plastics, petrochemicals or petroleum, or a combination thereof. However, the regenerative wear material 10 is not limited to or by these particular potential ingredients or proportions, except and only to the extent as may be expressly specified otherwise in any particular claims hereof and only for such claims and other claims depending therefrom.

Through wear or abrasion of the exemplary regenerative wear material 10 (e.g., via the natural movement of humans wearing shoes 32), environmentally-friendly ingredients contained therein should be released. The released environmentally-friendly ingredients (e.g., nutrients) can ultimately have a positive impact on soil or other earthen material, the surrounding environment and plant and/or animal life, such as by enhancing soil structures, offsetting (e.g., trail) erosion, building strength and immunities in plants and/or animals, promoting the growth of vegetation, helping build resiliency against climate change by regenerating soil organic matter, enhancing soil biodiversity, providing nutrient storage and improving the water cycle, have any other purposes or a combination thereof. Incorporating nutrients (e.g., soil matter and/or plant matter) into the wear portions 20 of items 30 via the regenerative wear material 10 thus has the potential to help actively regenerate our soils and ecosystems. Further, in many embodiments, agricultural waste can be used in the production of the regenerative wear material 10 (such as by extracting nutrients therefrom), and thus be recycled and repurposed in a beneficial way and to help preserve the planet.

If desired, the regenerative wear material 10 can be manufactured without ingredients that are harmful to the ecosystem and so that the material 10 itself does not become harmful waste. Further, when regenerative wear material 10 is used on items 30 instead of other types of wear materials that include environmentally harmful ingredients or which otherwise become waste, the environment benefits from a reduction in the presence of the other types of wear materials. Thus, the production and use of regenerative wear material 10 can benefit the environment in multiple ways, such as by providing (beneficial) nutrients into the ecosystem, not itself harming the ecosystem and reducing the use, production and presence of harmful wear material.

Referring specifically to FIG. 1A, in another independent aspect, various embodiments involve one or more material release trackers 50 having any desired purposes and uses. For example, the material release tracker 50 can be useful to provide material release information and/or help measure, track, monitor, indicate, estimate, evaluate or provide wear information. The terms "material release information" and variations thereof refer to information provided, presented or displayed by, or derived from, a material release tracker 50 that can be used to determine wear information. The terms "wear information" and variations thereof refer to any desired information generally relating to the composition, functionality, use or performance of, or wear to, any item having one or more wear portions. Some potential examples of wear information include the amount, or other characteristics, of wear material (or ingredients thereof) released from the wear portion 20 due to abrasion (e.g., FIG. 2) or other causes during use, information involving patterns of use of the item 30 or wear to the item 30 (e.g., for replacement, remediation, redesign, etc.), the impact of the use of the item 30 (or wear thereto) upon the item itself, user or environment, such as to improve product performance, optimize product design, efficiency or effectiveness, modify the item to better fit the user, take corrective action with respect to the item, modify user behavior or methodology, detect use-abnormalities (e.g., exaggerated pronation or supination during use of footwear, imbalance of vehicles or equipment during operation), potential injury, fatigue or damage to equipment (e.g., elastomeric or metal fatigue) or failure thereof, misuse or abuse of or damage to equipment or corresponding responsive measures (modifications to footwear, predictive, preventative or responsive maintenance of equipment, etc.), for any other purpose(s) or a combination thereof.

In some embodiments, wear information may be provided as a "nutrient output score." For example, the nutrient output score may be an approximate total amount (e.g., by weight, volume, etc.) of nutrients or other ingredients released from the wear portion 20 of one or more items 30 based upon the amount of shedded regenerative wear material 10 from wear thereto. For another example, the nutrient output score could instead include a range of amounts of released nutrients, relate to other characteristics of nutrients released (or retained in the item(s) 30), such has the type of nutrient(s) shed, the environmental impact of the nutrients shed, the amount of each of certain types of nutrients shed, include other wear information (e.g., not relating to nutrients) or a combination thereof.

Still referring to FIG. 1A, the exemplary material release tracker 50 will display or provide material release information that can be used to determine wear information. The material release information can have any desired form, be detectable and correlate with wear information in any suitable manner. For example, the material release information may be in the form visible indicia (e.g., one or more visible material discharge features or patterns of the material release tracker 50), sound (e.g., an audible signal from a transmitter or diode of the material release tracker 50), smell (e.g., from a scent-emitting material release tracker 50 (see e.g., U.S. Pat. No. 10,994,521 incorporated by reference herein)), light (e.g., from a light-emitting material release tracker 50 (see e.g., U.S. Patent Application Publication Number 2017/0258173 incorporated by reference herein)), movement (e.g., via a vibrating material release tracker 50), be based upon any other detectable characteristics of the material release tracker 50 or a combination thereof.

In some embodiments, the material release tracker 50 can be simple, intuitive for the use thereof, easy and cost-effective to manufacture, use and replace, can serve as a real-time, on-demand, continuous or immediate indication of material release information and/or wear information of the item 30 (e.g., on an ongoing basis throughout the life if the item 30 or at any desired time), can have other benefits and characteristics, or a combination thereof.

Still referring to FIG. 1A, if desired, the regenerative wear material 10 and/or material release tracker 50 can be used for, or in conjunction with, abrasion tests, such as for product evaluation, planning and design or other purposes. In some instances, abrasion tests can be useful to aid in designing and placing the regenerative wear material 10 and material release tracker 50 on the items 30. Some exemplary types of abrasion tests that may be useful to provide abrasion test scores of wear material include ASTM D4060-19 Standard Test Method for Abrasion Resistance of Organic Coatings by the Taber Abraser, ASTM D3885—Standard Test Method for Abrasion Resistance of Textile Fabrics (Flexing and Abrasion Method), ASTM D5963—Rotary Drum Abrader Standard Test Method for Rubber Property—Abrasion Resistance, ASTM D8115—Standard Test Method for Rubber Property—Abrasion Resistance (Multi-Directional Platform Abrader), ASTM D1630—Standard Test Method for Rubber Property-Abrasion Resistance (Footwear Abrader), ASTM C 1353—Abrasion Resistance—Standard Test Method for Abrasion Resistance of Dimension Stone Subjected to Foot Traffic Using a Rotary Platform, Double-Head Abraser, DIN 53 516—DIN Abrasion Testing of Rubber and Elastomers, Determination of Abrasion Resistance; ASTM D 1630—NBS Abrasion Standard Test Method for Rubber Property—Abrasion Resistance (Footwear Abrader), ASTM D 2228 Pico Abrasion Standard Test Method for Rubber Property—Relative Abrasion Resistance by The Pico Abrader Method, ISO 4649 Rotating Cylindrical Drum Rubber, Vulcanized or Thermoplastic—Determination of Abrasion Resistance Using a Rotating Cylindrical Drum; and STM D 3389 Taber Abrasion Standard Test Method for Coated Fabrics Abrasion Resistance (Rotary Platform, Double-Head Abrader). The regenerative wear material 10 and/or material release tracker 50 can also or instead be used for, or in conjunction with, any other abrasion tests, such as abrasion tests that are internal to the testing or another entity, or which may be developed in the future. However, the present patent does not require abrasion testing and it not limited to, or by, these examples in any way.

While wear to the wear portions 20 of the items 30 during use thereof is often caused by abrasion, neither this patent nor any of the appended claims are limited to the loss of wear material only from abrasion, or abrasive wear, except and only to the extent as may be expressly specified otherwise herein or in any particular claims hereof and only for such specific references or claims and other claims depending therefrom. For example, particles of wear material may break off from the wear portion 20 of the item 30 due to deterioration, external forces exerted on the wear portion, other internal or external factors (e.g., chemical reaction, temperature, temperature changes, etc.) or any other cause.

Still referring to FIG. 1A, the illustrated material release tracker 50 is useful to help measure, track, monitor, indicate, estimate, evaluate or provide wear information relating to one or more wear portions 20 of one or more items 30 that include regenerative wear material 10 (having nutrients therein), such as the amount of regenerative wear material 10 shed during use, the amount and/or type of nutrients released therefrom (and which may be deposited into the environment), other wear information or a combination thereof. The illustrated material release tracker 50 is thus a regenerative wear material release tracker. Specifically, as the user is actively using the item 30 (e.g., wearing down the wear material through abrasion or surface friction such as during the use of footwear 32, FIG. 2), the exemplary material release tracker 50 will display or provide material release information. However, in other embodiments, the material release tracker 50 could instead provide the wear information or provide both material release information and wear information. Additionally, while the material release trackers 50 shown and described in this patent are used to provide material release information relating to regenerative wear material 10, they can be used to provide material release information and/or wear information in connection with any type of wear material (not only regenerative wear material 10) or for any other purposes.

The regenerative wear material 10 and/or material release tracker 50 may be used with any desired items or components thereof, such as tires, footwear and other examples provided in the definition of "item" above. Thus, the types of items with which the regenerative wear material 10 and/or material release tracker 50 may be used are not limited or limiting upon this patent or any appended claims, except and only to the extent as may be expressly specified otherwise herein or in any particular claims hereof and only for such specific references or claims and other claims depending therefrom.

Still referring to FIG. 1A, the regenerative wear material 10 and/or the material release tracker(s) 50 may be provided at any location(s) in, or on, the item 30 or any components thereof. For example, wear abrasion to the wear portions 20 of an item 30 may often occur at specific locations on the item 30, or in a consistent pattern, indicating how the item 30 is being used (or misused), where the highest frequency of wear to the item 30 occurs, and so on. If desired, the regenerative wear material 10 and/or one or more material release trackers 50 may be provided at any such locations.

With respect to wear abrasion on shoes 32, it is suggested that the erect stride or gait of modem-day humans follows an evolutionary pattern that is pronounced in common impact areas of the foot. Studies of stride and impact patterns used in understanding routine wear of footwear tread patterns suggest that the areas of footwear tread 38 that visually display the most wear abrasion, or loss of material, are correlational to the areas that receive the highest levels of impact and friction. FIGS. 3A-D show some of these known high impact areas on footwear 32, any of which can be locations for the regenerative wear material 10 and/or material release trackers 50 in various embodiments. However, this patent is not limited to these particular wear areas and many embodiments may not involve any of the illustrated locations.

Figure 4A:
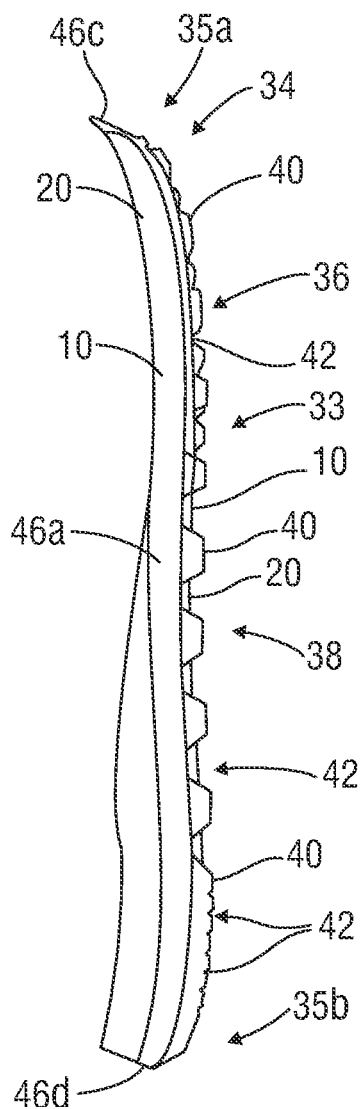
FIG. 4A is a perspective view of an exemplary shoe outsole including regenerative wear material in accordance with one or more embodiments of the present disclosure.
Figure 4B:
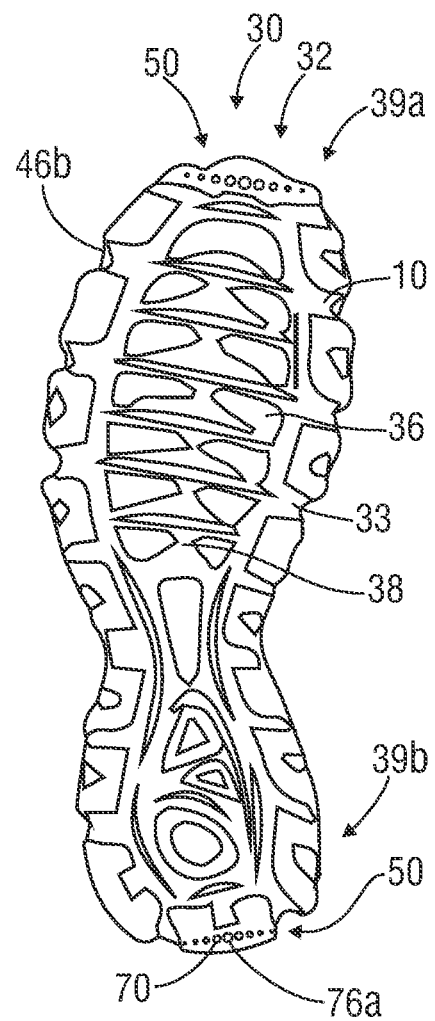
FIG. 4B is a bottom view of the exemplary shoe outsole shown in FIG. 4A.
Figure 5:
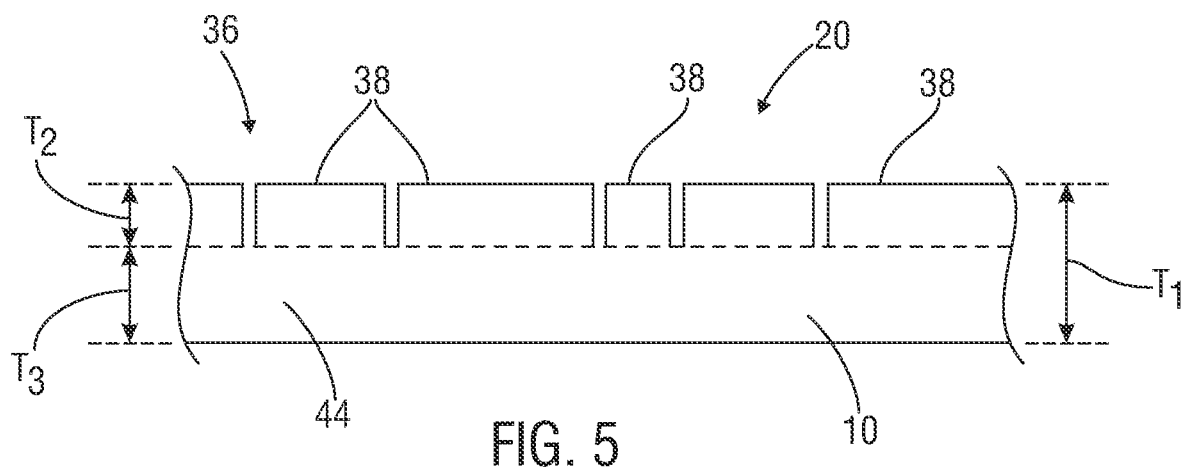
FIG. 5 is a side view of part of an exemplary wear portion of an item including regenerative wear material in accordance with one or more embodiments of the present disclosure.

Referring now to FIGS. 4A-B, the wear portion 20 of the illustrated item 30 is shown generally including one or more outer surfaces, or wear faces, 36, that will experience wear (e.g., through contact with the ground or other surfaces, things or items). The wear portion 20 often includes tread 38, which may extend from a base, or under-tread, 44 (e.g., FIG. 5) to form a unitary wear portion 20. For example, the wear portion 20 may be a shoe outsole 34 having tread 38 extending across the entire wear face 36, which extends across the entire bottom 33 of the shoe 32. Often, the outsole 34 of the shoe 32 is coupled (e.g., with adhesive) to a midsole, upper sole or other component(s) of the shoe 32. In this embodiment, the entire outsole 34 may be constructed of regenerative wear material 10 and a distinct material release tracker 50 may extend from the wear face 36 (tread 38) into the wear portion 20 (outsole 34) proximate to the respective upper and lower end 39a, 39b thereof (near the respective front and rear ends 35a, 35b of the shoe 32).

Still referring to FIG. 4A-B, in some instances, one or more material release trackers 50 may be provided at least partially in, or across, one or more protrusions (aka lugs) 40 and/or depressions 42 often included in the tread 38 of the item 30. Likewise, the exemplary material release trackers 50 may be provided on, or in, any wall 46 of the shoe 32 or other item 30, such as a medial side wall 46a, lateral side wall 46b, front wall 46c, rear wall 46d, or any other location (e.g., the top, front or back of the item, on a shoe midsole, upper sole, unisole, insert or other components). In FIGS. 7A-C, for example, a material release tracker 50 is provided in the lateral side wall 46a of the shoe 32. For another example, some shoes 32 do not have an outsole, and thus the regenerative wear material 10 and material release trackers 50 may be provided in the midsole or other part of the shoe 32.

Depending upon the item 30, there may be other locations where regenerative wear material 10 and/or material release trackers 50 can be used. In FIG. 8, for example, the item 30 includes regenerative wear material 10 only in upper and lower inlays, or traction pads, 26 provided at expected hi-wear areas of the wear portion 20 of the shoe 32 (e.g., near the front and rear ends 35a, 35b of the shoe 32). The traction pads 26 may have any suitable form, configuration and operation. For example, the traction pad 26 may be the same thickness, or thinner (e.g., 1.0-3.0 mm thick, or more or less), than the outsole 34, placed in a recess, or cavity, formed in the outsole and/or midsole and attached thereto via a lamination or other process.

However, the present disclosure is not limited to or by any of the aforementioned details relating to shoes (or other items). Moreover, while shoes 32 are used herein to describe and illustrate various aspects of the present disclosure, any features of the present disclosure (e.g., the regenerative wear material 10 and material release trackers 50) may be used in connection with the wear portions 20 (with or without tread 38) of any types of item 30.

Referring back to FIG. 1A, the wear portion 20, regenerative wear material 10 and material release tracker 50 (when included) may have any desired thickness or depth. For example, the approximate original thickness $T_1$ of the wear portion 20 and regenerative wear material 10 shown in FIG. 5 may be 8.0 millimeters (mm). If the exemplary wear portion 20 includes tread 38 and a base 44, the approximate thickness $T_2$ of the tread 38 may be 3.0 mm and approximate thickness $T_3$ of the base 44 may be 5.0 mm. However, each such thickness could be more or less (0.50 mm, 1 mm, 2 mm, 3 mm . . . 9 mm . . . 15 mm or more). For another example, the material release tracker(s) 50 may extend any desired depth 82 in the wear portion 30, such as only into the tread 38 (when included) or, in some cases, deeper into the base 44 or other part of the wear portion 30 or other component.

Referring again to FIG. 1A, any desired number of material release trackers 50 (e.g., 1, 2, 3, 4, 5 and so on) may be provided in, or on, any number of items 30. While FIG. 1A illustrates the use of material release trackers 50 proximate to the upper and lower end 39a, 39b of the wear portion 20, FIG. 6A includes a third material release tracker 50 in or proximate to the midsection 39c of the wear portion 20 (e.g., the midfoot portion of the outsole 34). However, these are just examples and the present disclosure is not limited by or to such particular arrangements. Accordingly, the location, thickness and depth of the wear portion 20 and regenerative wear material 10 and the location, thickness, depth and quantity of material release trackers 50 are not limiting upon this patent or any appended claims, except and only to the extent as may be expressly specified otherwise herein or in any particular claims hereof and only for such specific references or claims and other claims depending therefrom.

When included, multiple material release trackers 50 on the same, or multiple, items 30 can be used in any desired manner. For example, concurrent material release information from multiple trackers 50 may be averaged. For another examples, material release information from specific material release trackers 50 on, or in, one or more items 30, such as at specific locations reflecting the unique wear pattern of a particular user, may be selected for evaluation.

More than one material release tracker 50 on one or more items 30 may be desirable for any suitable reason. In many instances, using material release information from material release trackers 50 at different locations on one or more items 30 at the same point in time may correlate with wear information that more accurately reflects the actual wear to the wear portion(s) 20. This could be beneficial, for example, when there may be non-uniform dispersion of nutrients in the regenerative wear material 10, so that evaluating material release information from multiple different locations on the item(s) 30 may provide a more accurate reflection of nutrient output. For another example, using multiple material release trackers 50 to arrive at wear information may be desirable when there is variability in the use of the item 30 that leads to differing wear locations on the wear portions 30 thereof. Some items 30 may experience a non-uniform or maybe even a random wear pattern, so that measuring material discharge at only one location will not accurately reflect total wear to the wear portion 20. In the use of footwear 32, for example, any particular user may have a unique stride pattern, foot impact pattern, gait, or natural foot movements (e.g., pronation, supination) that can affect what parts of the wear portion(s) 20 of the shoe 32 will wear. For still a further example, using multiple trackers 50 to arrive at wear information may be desirable if the types of surface(s) that the wear portion 20 contacts lead to differing wear patterns.

Referring back to FIG. 1A, the material release tracker 50 may be provided on or in, or be associated with, the wear portion(s) 20 of the item 30 in any desired manner. In some instances, the material release tracker 50 may be formed, engraved, molded or embedded into, printed on, siped, or adhered, to, or integral with, the wear portion 20 or item 30. For example, depending upon the nature and form of the item 30, wear portion 20 and/or material release tracker 50, as well as other variables, the material release tracker 50 may be formed with liquid silicone injection molding (LSM), casting, injection molding, blow molding, compression molding, rotational molding, laser engraving/CNC, heat stamping/embossing, 3D printing/additive manufacturing, direct injection or a combination thereof. In the present embodiment, a steel cavity compression tool is used to stamp or imprint the material release trackers 50 into the wear portion 20. However, the present disclosure is not limited to these exemplary methods, and any other suitable techniques for manufacturing, forming, assembling and providing the material release tracker 50 may be used.

The material release tracker 50 may be constructed of any desired material(s). For example, the material release tracker 50 may be constructed at least partially of regenerative wear material 10, rubber-based materials (NBS, EPDM, SBR, Butyl, Fluorosilicone, Nitrile, Silicone, Neoprene, Natural Rubber (e.g., Amazonian rubber (*Hevea brasiliensis*) and other members of the spurge family (*Euphorbia*), rubber fig (*Ficus elastica*), Panama rubber tree (*Castilla elastica*), lettuce (*Lactuca* species), the related *Scorzonera tau-saghyz*, various *Taraxacum* species such as common dandelion (*Taraxacum officinale*) and Russian dandelion, guayule (*Parthenium argentatum*), bio or plant-based rubber), EVA (Ethylene-vinyl acetate), Thermal Plastic Urethanes (TPU), Polyurethane's (PU), Nylon's, Synthetic Fibers, Natural Fibers, 3D filaments, metal and the like, or a combination thereof. Thus, this patent in not limited by the manner, or technique, for forming or providing the material release tracker 50 in the item 30, or the type of material used to construct or form the material release tracker 50, except and only to the extent as may be expressly specified otherwise herein or in any particular claims hereof and only for such specific references or claims and other claims depending therefrom.

Still referring to FIG. 1A, when included, the material release tracker 50 may have any suitable form, configuration, components and operation. For example, the material release tracker 50 may include one or more visible tools, designs, features or patterns provided on, or in, the wear portion(s) 20 of the item 30, or be associated therewith, and have any desired size, shape, thickness and other dimensions to provide material release information and/or wear information. The exemplary material release tracker 50 is designed, configured and placed so as not to adversely affect or jeopardize the strength, integrity, performance, durability, grip, water resistance, longevity or other characteristics of the wear portion 20 and item 30.

In some embodiments, the material release tracker 50 may include one or more distinct components formed, embedded or otherwise provided in, or affixed to, the item 30 and having any suitable form and operation. If desired, the material release tracker 50 may be a distinct component (e.g., constructed of environmentally-friendly material) that itself wears down or changes in a detectable manner to provide the desired material release information and/or wear information. Some examples of distinct components that can be used as, or in connection with, certain embodiments of the material release tracker 50 are disclosed in U.S. Pat. No. 10,821,783 issued on Nov. 3, 2020 to Schimmoeller et al. and entitled "Visual Wear Indicator", U.S. Patent Application Publication Number 2002/0078598A1 to Bell, published on Jun. 27, 2002 and entitled "Sole for Footwear or Footwear Attachment having Multilevel Cleats for Indicating Wear and Providing Enhanced Traction and Flexibility", U.S. Patent Application Publication Number 2016/0219972 to Davies, published on Aug. 4, 2016 and entitled "Improvements in and Relating to Footwear and Foot Wear Analysis", U.S. Pat. No. 10,994,521 to Hodjat et al., issued on May 4, 2021 and entitled "Rubber Product with Wear Indicating Layers", U.S. Pat. No. 7,353,770 to Sanguinetti, issued on Apr. 8, 2008 and entitled "Visual Wear Indicator for Footwear", U.S. Pat. No. 6,922,916 to Potter, issued on Aug. 2, 2005 and entitled "Footwear with Outsole Wear Indicator", U.S. Patent App Pub. No. US2008/0168833 to Awad, entitled "Apparatus and Method for Measuring Tire Thickness", filed on Jan. 16, 2007 and published on Jul. 17, 2008, U.S. Pat App Pub No 2012/0049610 to Lew, entitled "Rim Wear Indicator" and filed on Aug. 30, 2010 and published on Mar. 1, 2012 and United Kingdom Patent Application Number GB2411336A to Jones et al., published on Aug. 31, 2005 and entitled "A Shoe Including a Sole with Wear Indicating Means", the entire contents of which are hereby incorporated by reference herein.

In various embodiments, the material release tracker 50 can incorporate or involve color (e.g., via a color code or scheme), such as to indicate the degradation, or shedding, of wear material (e.g., by volume, weight, thickness) from the wear portion 20 of the item 30 or for any other purpose. For example, the material release tracker 50 may have a different color than the wear material or wear portion 20. For another example, the material release tracker 50 may provide different colors at different thicknesses or be associated with different layers of wear material in the wear portion 20 of the item 30, each colored-layer representing an estimated amount of shedded wear material (at that location or across the entire wear portion 20) or other material release information or wear information. In some embodiments, as one exemplary colored-layer wears off, a different colored-layer could be revealed that correlates with an estimated amount of wear material loss, nutrient output score, other wear information or a combination thereof. For yet another example, the material release tracker 50 may include one or more cut-outs extending into the wear portion 20 from the wear face 36 so that the wall of the cut-out can be viewed to see the remaining layers. Some examples of the use of color that can be used as, or in connection with, certain embodiments of the material release trackers 50 are disclosed in United Kingdom Patent Application Number GB2411336A, U.S. Patent Application Publication Number 2016/0219972 to Davies, published on Aug. 4, 2016 and entitled "Improvements in and Relating to Footwear and Foot Wear Analysis", U.S. Patent Application Publication Number 2017/0258173 to Johnson, published on Sep. 14, 2017 and entitled "Running Shoe Wear Indicator", U.S. Pat. No. 7,353,770 to Sanguinetti, issued on Apr. 8, 2008 and entitled "Visual Wear Indicator for Footwear", and U.S. Pat. No. 6,922,916 to Potter, issued on Aug. 2, 2005 and entitled "Footwear with Outsole Wear Indicator", the entire contents of which are hereby incorporated by reference herein.

If desired, color (or other features) can be used to aid in seeing, detecting or measuring the material release tracker 50 or information relating thereto. For example, the material release tracker itself 50, or wear material surrounding it, may be provided in a different color than other parts of the wear portion 20 or item 30 to highlight or accentuate the material release tracker 50 or material release information provided thereby. In some instances, the wear portion 20 could be at least partially translucent to aid in viewing the material release tracker 50 and/or material release information provided thereby.

In another aspect, one or more features may be provided to aid in seeing or detecting ingredients of the regenerative wear material 10 and/or observing wear to, or the discharge of, regenerative wear material 10. In FIGS. 9A-B, for example, the composition and/or color of the regenerative wear material 10 is configured so nutrients 14 therein are at least partially visible or detectable. In this case, at least some of the visible, or detectable, nutrients 14 have a darker color than the remainder of the regenerative wear material 10 so the wear portion 20 appears at least partially speckled. While the majority of nutrients in the illustrated regenerative wear material 10 are unlikely to be visible to the naked eye, forming the wear portion 20 with some visible nutrients 14 may help users and others visualize, detect and/or appreciate the contribution of nutrients (to the environment) throughout the life of the item 30 as it wears, serve as a positive empowerment tool by indicating the benefit that their activities (e.g. movement) or use of the item 30 have on the environment, serve as a visible indicator that this item 30 is a type that provides the positive benefits of regeneration, repurposing and environmental stewardship, have any other purposes or a combination thereof. However, the aforementioned variations and features are not required in every embodiment.

Referring back to FIG. 1A-C, in another independent aspect of the present disclosure, the material release tracker 50 may include a visible, or otherwise detectable or recognizable, discharge configuration or pattern 60 extending across at least part of the wear portion 20 of the item 30 to help provide material release information and/or wear information or for any other purposes. When included, the discharge pattern 60 may have any suitable form, construction, components and operation. For example, the discharge pattern 60 could be in the form of one or more letters, words, images or other indicia formed into or provided on, or by, the wear portion 20. For another example, the discharge pattern 60 may include one or more material discharge features, or elements, 70 having any suitable form, configuration, location and operation.

Figure 10A:
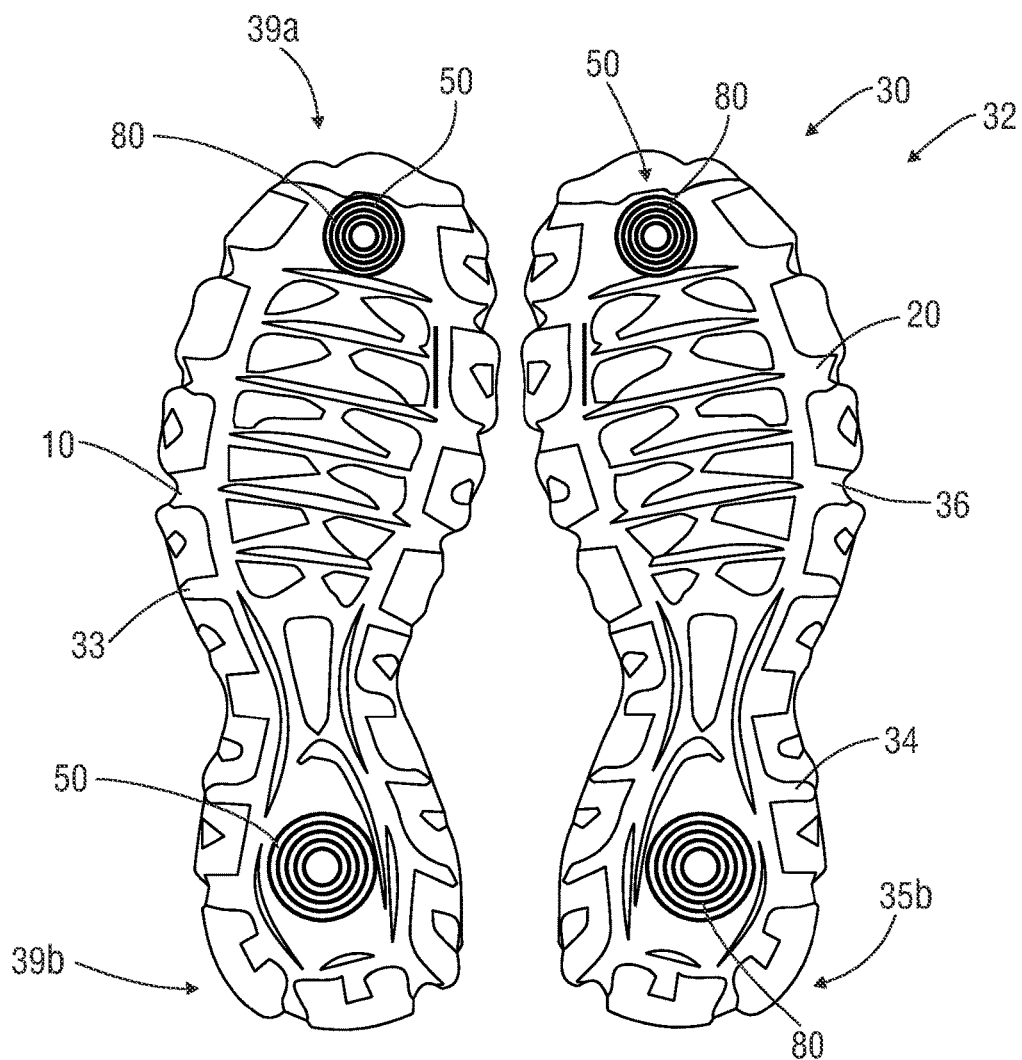
FIG. 10A is an exemplary pair of shoes having a pair of material release trackers with material discharge features in a circular configuration in accordance with one or more embodiments of the present disclosure.
Figure 10B:
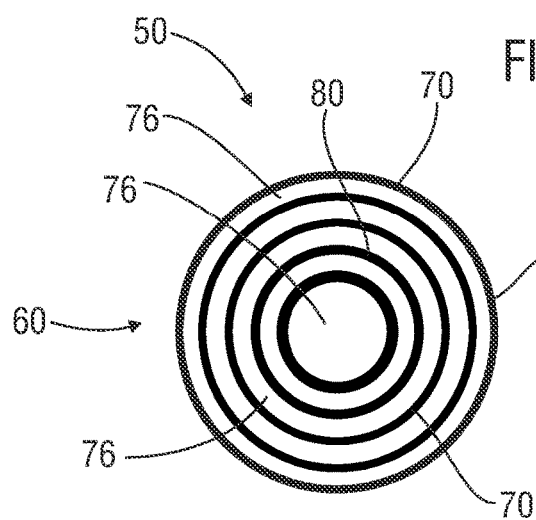
FIG. 10B is a front isolated view of either of the material release trackers shown in FIG. 10A.
Figure 10C:
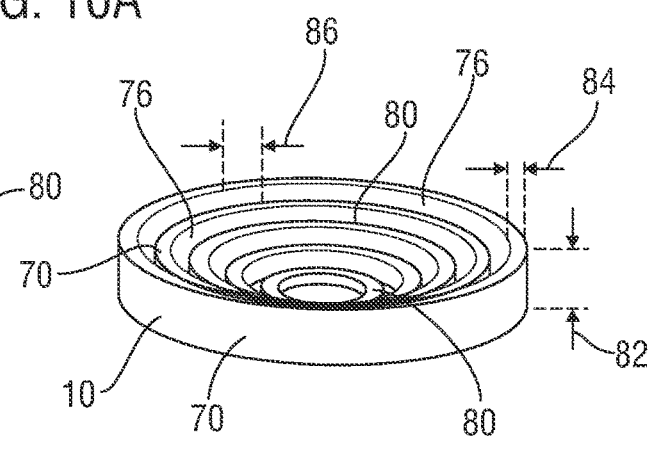
FIG. 10C is an isolated perspective view of the material release tracker shown in FIG. 10B.

In some embodiments, the material discharge elements 70 may be distinct spaced-apart depth gauges 76 extending inwardly into the wear portion 20 of the item 30, such as from the wear face 36 thereof. The illustrated depth gauges 76 include multiple linearly arranged, different-sized cavities, each having a generally circular, or rounded, shape and extending into the outsole 34 from the bottom 33 of the shoe 32. For another example, in FIGS. 7A-C, the depth gauges 76 are elongated oval-shaped cavities extending into the lateral side wall 46a of the wear portion 20 (e.g., in the outsole, midsole, unisole, etc.). For yet another example, the discharge configuration 60 of FIGS. 10A-C includes multiple concentrically arranged grooves surrounding a central cavity formed at desired locations in the wear portion 20 of the item 30. In that embodiment, the depth gauges 76 are a series of ridges 80 formed between the illustrated grooves. However, the material discharge elements 70 could have any desirable shape (e.g., random, hexagonal, triangular, square), size, configuration, location, pattern and operation. Thus, the present patent is not limited to, or by, the above examples or any details thereof, except and only to the extent as may be expressly specified otherwise herein or in any particular claims hereof and only for such specific references or claims and other claims depending therefrom. For example, the discharge pattern 60 may include only one material discharge element 70 and/or have any other components, purpose or function and may itself provide the wear information.

Referring back to FIGS. 1A-C, when included, the exemplary material discharge elements 70 may have any desired dimensions. For example, the illustrated depth gauges 76 have a depth 82 ranging from 0.67 mm-3.35 mm, a width, or diameter, 84 ranging from 1.00 mm-4.00 mm and spacing between gauges 76 ranging from 1.99 mm-2.50 mm. Of course, these dimensions and the values thereof are exemplary only and not limiting upon this disclosure, except and only to the extent as may be expressly specified otherwise herein or in any particular claims hereof and only for such specific references or claims and other claims depending therefrom. While some of the exemplary depth gauges 76 vary in size, they could all have the same size or be sized in any other manner.

In another independent aspect of the present disclosure, the material release tracker 50 may provide material release information and provide, or be correlated with, wear information in any suitable manner. In many embodiments, the state, condition or appearance of the material release tracker 50 may provide, or serve as, the material release information. For example, when the material release tracker 50 includes one or more material discharge elements 70, one or more dimensions or other characteristics, or the appearance, or state, of the material discharge element(s) 70 can be used to determine, provide or estimate the material release information and/or wear information. In fact, the material discharge elements 70 may be designed and located so that throughout the life and use of the item 30, one or more characteristics (e.g., the state, condition or absence thereof) will effectively serve as the material release information and correlate with the desired wear information. For example, as friction is applied to the wear portion 20 (e.g., outsole 34) and the (regenerative) wear material abrades and breaks off (e.g., FIG. 2), one or more of the material discharge elements 70 may wear away, or change in another detectable manner (e.g., by color, shape, etc.).

Still referring to FIGS. 1A-C, in the present embodiments, the wearing away of the material discharge elements 70 and their changing appearance serves as the material release information of the material release tracker 50 and can be correlated with the desired wear information. In essence, during the continued use of the item 30 throughout its useful life and as more friction is applied, the abrasion to the wear portion 20 will continue or increase and the exemplary material discharge elements 70 will change by wearing away, so that as the wear material wears away, the material discharge elements 70 wears away. In the present embodiments, as less and less of the wear material remains on the exemplary item 30, the smaller or shallower depth gauges 76 will disappear and the configuration 60 of material discharge elements 70 will change.

If desired, the wearing away of the exemplary material discharge elements 70 may be evaluated and correlated with wear information based upon depth. For example, the base 78 of each illustrated depth gauge 76 may be formed a precise or approximate distance, or depth, 82 in the wear portion 20 of the item 30 from the wear face 36 thereof. That depth 82 can be corresponded with desired wear information, such as a pre-determined estimated volume, thickness or loss of the wear material for the entire wear portion 20, which can, if desired, be correlated with other wear information. In the present embodiments, the depth of each exemplary depth gauge 76 can be used to estimate the total amounts of shedded wear material across the entire wear portion 20 and also the estimated total amount of nutrients discharged therewith. However, in other embodiments, any combination of dimensions (e.g., depth 82, width 84, spacing 86, etc.) or other characteristics (e.g., color, size, shape, location) of the material discharge elements 70 can be used as the material release information or wear information, or used to correspond with any desired wear information.

Still referring to FIG. 1A-C, in use of the illustrated discharge configuration 60, when one or more of the exemplary depth gauges 76 disappears due to wear or has been worn down to its base 78 during the life of the item 30, this can be correlated with an estimated (i) thickness $T_1$ (e.g., FIG. 7A) of wear material remaining in (or shedded from) the entirety of the wear portion 20 and (ii) associated amount of nutrient output. For example, when the illustrated outsole 34 of the shoe 32 has worn down to the base 78 of a depth gauge 76, or the depth gauge 76 has been worn away, an estimated value for the overall thickness loss of the entire wear portion 20 can be determine and, from that, the amount nutrient output estimated. However, in other embodiments, the depth gauge 76 (or other form of material discharge elements 70 or material release tracker 50) could provide any other desired material release information in a different manner, or directly provide any desired wear information.

In practice with the exemplary embodiments, the visible remaining portion(s) of the material release tracker 50 can serve as the material release information, which is correlated with the desired wear information. Specifically, the exemplary material release tracker(s) 50 can be viewed or read at different stages (e.g., at any time) during the life, or use, of the item 30 and associated with a score, value or measurement that reflects the desired wear information (e.g., amount of shedded wear material and/or nutrients released from the item 30). However, the material release information can take any other form and be provided and associated with wear information in any other manner.

Referring again to FIG. 1A, in another independent aspect of the present disclosure, any desired wear information provided by, or derived with the use of, one or more material release trackers 50 can be determined, presented and/or used in any suitable manner. For example, wear information can be calculated or determined based upon material release information with the use of test samples and test data, formulae, algorithms, artificial intelligence, neural networks and so on. While some examples of certain wear information metrics and values therefor are provided below, the present disclosure is not limited thereby or thereto, except and only to the extent as may be expressly specified otherwise in any particular claims hereof and only for such claims and other claims depending therefrom.

For the present embodiments, sample tests of abrasion loss of wear material were conducted to arrive at exemplary wear information (amount of nutrients lost based upon thickness loss) for wear portions 20 of items 30 constructed of regenerative wear material 10. However, the same sample tests could be used with other types of (e.g., non-regenerative) wear material. The sample abrasion tests were calculated using a pair of prototype hiking boots (U.S. men's size 10), the boot outsoles representing the wear portions 20 constructed entirely of regenerative wear material 10 and having a net weight of 275 grams (per pair), a net cubic volume of 216,000 mm (per pair) and a thickness of 8.0 mm each. (These values were based upon the average dimensions from an industry outsole sample set.) Through D5963 DIN (Method B) Abrasion Testing, on average and under normal expected environmental conditions, each outsole realized the equivalent of about 1.00 mm thickness loss of regenerative wear material for every 150 miles traveled on foot, or 12.5% of the total thickness of the regenerative wear material 10 on that shoe 32. A general rule of thumb for footwear is to replace shoes after 500 miles of regular use, sometimes referred to as the "disposal point". At that disposal point, or loss of approximately 41.7% of the total thickness of both outsoles, the exemplary tested outsoles had a total estimated nutrient output, or nutrient output score, of about 34.4 grams per pair.

Tables A & B show exemplary calculations of wear information based upon the sample tests. Table A provides baseline exemplary values for certain variables associated with the regenerative wear material 10 for the sampled footwear. The nutrients made up approximately 30% of the weight, or 82.50 grams (g), of both sample outsoles (combined). Put another way, if the user wears off, or sheds, the entire outsole of both sample shoes, approximately 82.50 g of nutrients would be released or shed.

TABLE A

| Net weight (g/pr) | Net volume (mm^3) | Total Outsole Thickness (mm/pr) | Abrasion rate (mm/mi) | Nutrients by weight (%) | Nutrients by weight (g) |
|---|---|---|---|---|---|
| *275 | 216,000 | *8.00 | 1/150 | 30% | 82.50 |

*Based on average pair of hiking boots with regenerative wear material on boot tread (M10)

Table B provides exemplary incremental calculations for the illustrated wear information. Thickness Loss reflects the approximate amount of total thickness of regenerative wear material 10 lost across the entire outsole of both shoes due to friction at a particular point in time. For the present embodiments, the thickness loss correlates with the wearing off of depth gauges 76 formed in the wear portion at depths in increments of about 0.67 mm, but could be based upon miles traveled/(150)(abrasion rate) or in any other suitable manner. The illustrated Weight Loss is the weight of that lost thickness across the entirety of both outsoles. The % of Total reflects the Thickness Loss as a percentage of the total original thickness of both outsoles. The Nutrient Output is the total estimated amount of nutrients contained in the shedded regenerative wear material 10 and which is, thus, discharged from the shoes (e.g., and released into the environment). In this example, the Nutrient Output is provided as the weight of the shed nutrients. Thus, approximately 6.90 g of nutrients are discharged or released from the shoe 32 by the time one or more exemplary depth gauges 76 having a depth of 0.67 mm wears off, approximately 13.80 g of nutrients are discharged by the time one or more exemplary depth gauges 76 having a depth of 1.34 mm wears off, and so on.

Table B also provides a hypothetical example of the amount of nutrient output of a large population of users of the exemplary items 30. The Number of Users is a sample macro data set reflecting a total of 40 million hypothetical users of the sample shoes and the Total Nutrients Output reflects the total hypothetical amount of nutrients released from use of 40 million pair of the sampled footwear.

TABLE B

| Wear Material Discharge Rate | | | Nutrient Output Rate | | |
|---|---|---|---|---|---|
| Thickness Loss (mm) | Weight Loss (g) | % of Total | Nutrient Output (g) | Number of Users | Total Nutrient Output (g) |
| 0.67 | 23.00 | 10% | 6.90 | 40,000,000 | 276,375,000 |
| 1.34 | 46.10 | 20% | 13.80 | 40,000,000 | 552,750,000 |
| 2.01 | 69.10 | 30% | 20.70 | 40,000,000 | 829,125,000 |
| 2.68 | 92.10 | 40% | 27.60 | 40,000,000 | 1,105,500,000 |
| 3.35 | 115.20 | 50% | 34.50 | 40,000,000 | 1,381,875,000 |

It should be noted that all values above and throughout this patent should be considered as approximations, except and only to the extent as may be expressly specified otherwise in any particular claims hereof and only for such claims and other claims depending therefrom.

In some embodiments, the wear information can be determined and/or provided by, or with, one or more material release converters 90. When included, the material release converter 90 may have any suitable form, configuration, contents and provide or determine any desired wear information in any suitable manner. For example, Table C is an embodiment of a material release converter 90 reflecting exemplary wear information based upon the use of the exemplary material release tracker 50 of FIGS. 11A-D.

In FIGS. 11A-D, the exemplary material release tracker 50 is formed in the wear portion 20 of each of two similar items 30 (e.g., a pair of shoes 32) and is constructed entirely of regenerative wear material 10. The illustrated material release tracker 50 has a similar pattern, or configuration, 60 of material discharge features 70 shown in FIG. 1A, namely a series of adjacent depth gauges 76 in the form of recessed cavities. In the present discharge configuration 60, there are four pairs of same-sized depth gauges 76 and one unique central depth gauge 76a. The approximate thickness loss in the wear portions 20 of both items 30 corresponding to each same-sized exemplary depth gauge 76 (e.g., cavity) is +0.67 mm. Similarly, the central depth gauge 76a also correlates with a total approximate thickness loss of +0.67 mm. Thus, the disappearance of each different-sized depth gauge(s) 76 of the exemplary material release tracker 50 represents approximately another 0.67 mm of regenerative wear material loss (across both items 30) and about 6.90 g of nutrients shedded (e.g., deposited into the environment).

TABLE C

| | Material Release Converter (90) | | |
|---|---|---|---|
| Row | Visual Configuration (60) | Net Thickness Loss (mm) | Net Nutrient Output (grams) |
| 1 | | 0.00 mm | 0.00 g |

TABLE C-continued

Material Release Converter (90)

| Row | Visual Configuration (60) | Net Thickness Loss (mm) | Net Nutrient Output (grams) |
|---|---|---|---|
| 2 | ... | 0.67 mm | 6.90 g |
| 3 | ... | 1.34 mm | 13.80 g |
| 4 | ... | 2.01 mm | 20.70 g |
| 5 | ... | 2.68 mm | 27.60 g |
| 6 | ... | 3.35 mm | 34.50 g |

The illustrated material release converter 90 of Table C correlates numerous different visible (or otherwise detectable) configurations 60 of the material discharge features 70 in the material release tracker 50 of the exemplary embodiments (that can occur at different times during the life of the item 30) with an estimated total amount of regenerative wear material discharged (in thickness) and an associated estimated total nutrient output (by weight) for the pair of items 30. While six different options of configurations 60 are shown for illustrative purposes, the material release converter 90 can provide every possible, or any desired, configurations 60. In this case, the values provided in the material release converter 90 are based upon the exemplary information from the test sample reflected in Tables A & B.

Referring back to FIGS. 11A-D, similarly as described above, as friction wears down the regenerative wear material 10, fewer and fewer depth gauges 76 of the material release tracker(s) 50 will be visible. At some point, as more of the exemplary regenerative wear material 10 has worn down, the deeper exemplary cavities 76 will remain visible while the shallower cavities 76 disappear, or are worn off. At different stages (e.g., any time) during the use or life of the item 30, the configuration of depth gauges 76 that remain visible in the material release tracker 50 can be matched and referenced to one of the discharge configurations 60 in the exemplary material release converter 90 of Table C to provide the desired wear information (e.g., approximate net thickness loss, nutrient output, material discharges rate, etc.). Row 2, for example, shows the visible configuration 60 of remaining exemplary material discharge elements 70 after the outermost pair of depth gauges 76 are effectively gone. At such time, the wear portions 20 of both items 30 have a total thickness loss of about 0.67 mm and have shed a total of about 6.90 g of nutrients. For another example, Row 4 shows an exemplary visible configuration 60 after the outermost three pairs of depth gauges 76 disappear and the corresponding estimated net thickness loss and nutrient output.

Figure 11A:
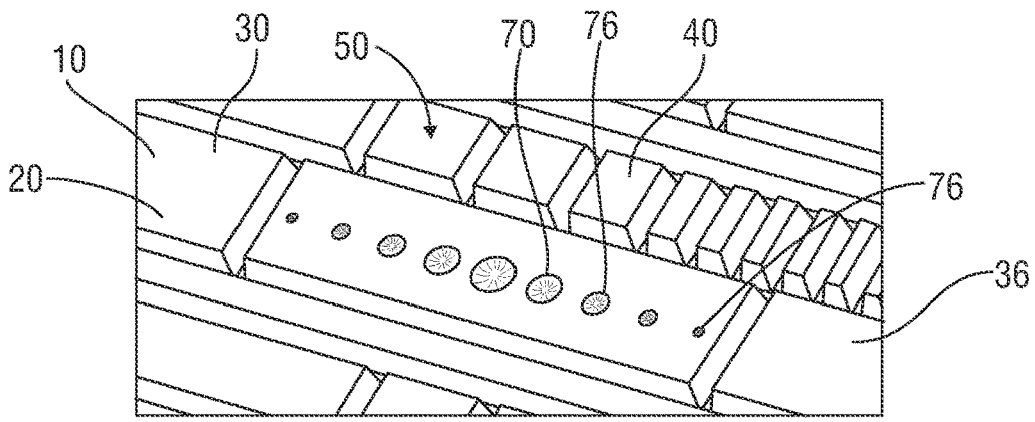
FIG. 11A is a perspective view of part of the wear portion of an item having a material release tracker in accordance with one or more embodiments of the present disclosure.
Figure 11B:
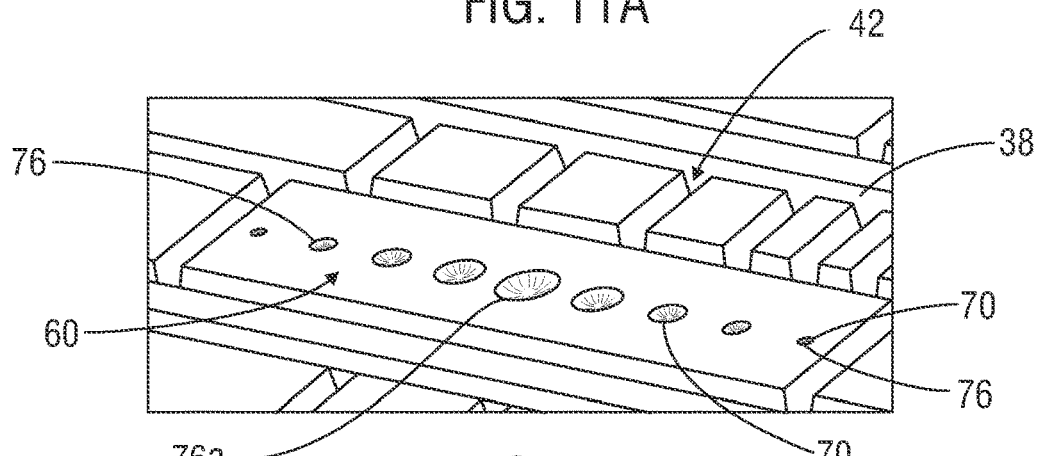
FIG. 11B is another perspective view of part of the wear portion shown in FIG. 11A
Figure 11C:
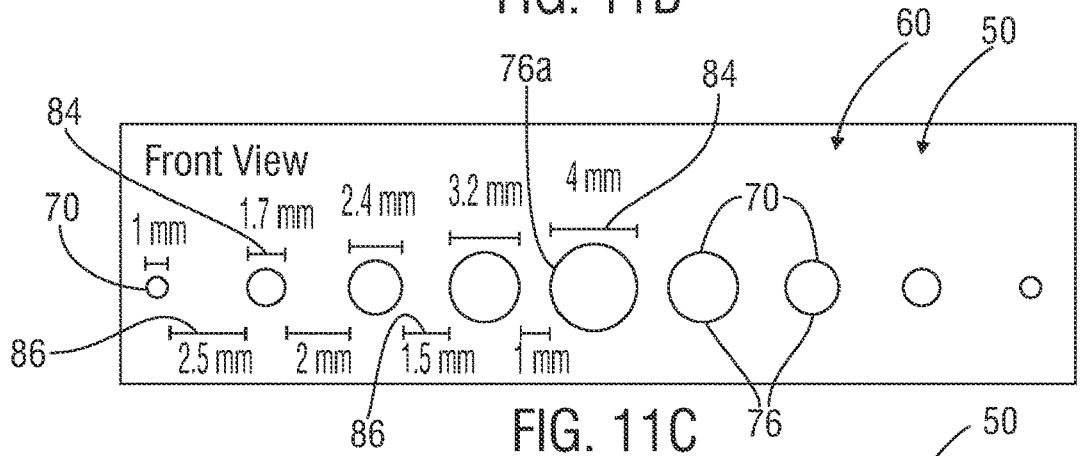
FIG. 11C is a front isolated view of the material release tracker shown in FIG. 11A and provides some exemplary dimensions thereof.
Figure 11D:
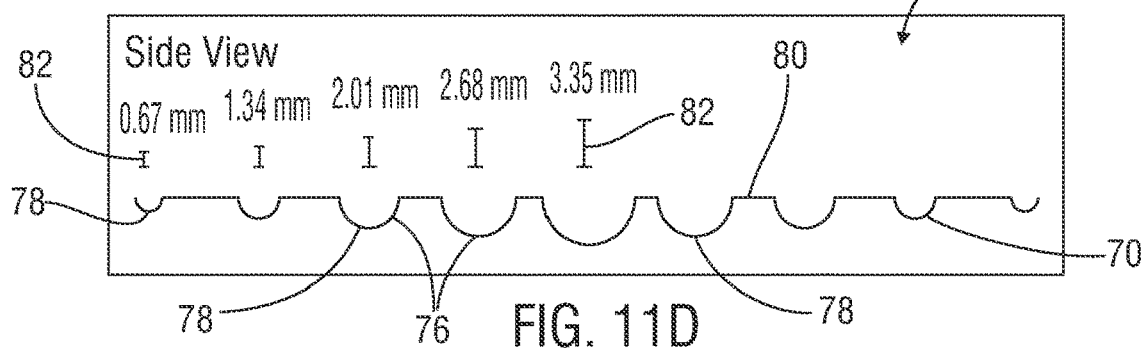
FIG. 11D is a side isolated view of the material release tracker shown in FIG. 11A looking from the front or rear of the wear portion and provides some exemplary dimensions thereof.
Figure 12A:
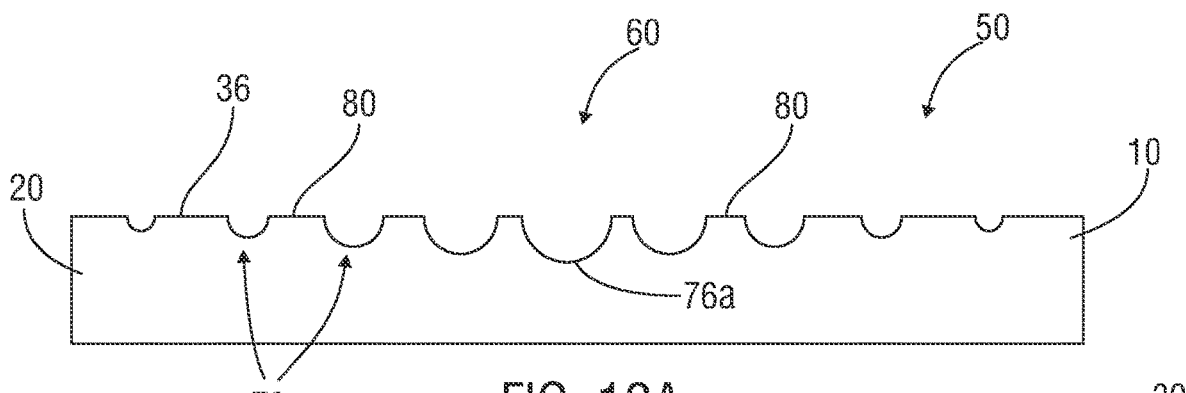
FIG. 12A is a side view of part of the wear portion shown in FIG. 11A looking from the front or rear of the wear portion.
Figure 12B:
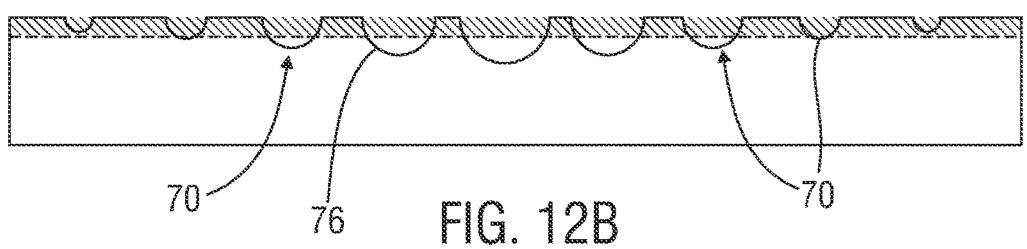
FIG. 12B is a side view of the wear portion of FIG. 12A showing exemplary shedded wear material after some wear thereto.
Figure 12C:
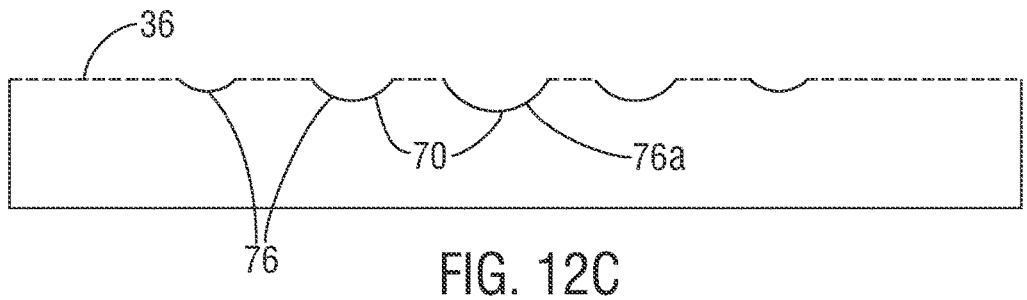
FIG. 12C is a side view of the wear portion shown in FIG. 12B.
Figure 12D:
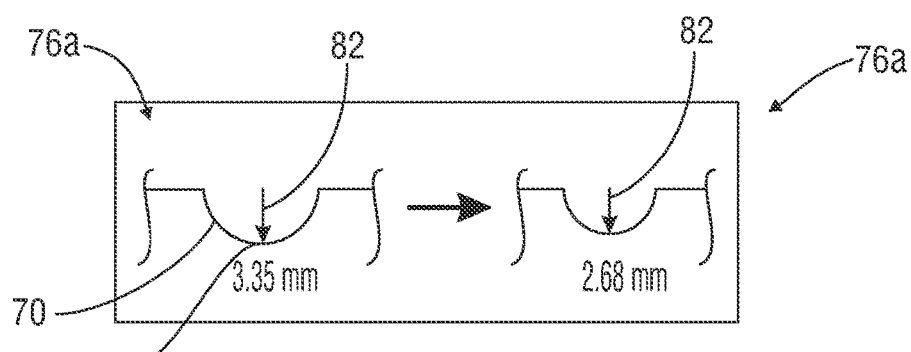
FIG. 12D is a side view of the exemplary middle depth gauge of the material release tracker of FIG. 11A before and after the wear shown in FIG. 12C.

Now referring to FIGS. 12A-D, an example wear pattern that may occur during use of the item 30 of FIG. 11A is shown. FIG. 12A shows the original, pre-use state of the item 30 and an exemplary material release tracker 50 of FIGS. 11A-D. FIG. 12B shows the amount of regenerative wear material 10 lost in the illustrated wear portion 20 after some use, indicating the outer two respective pairs of exemplary depth gauges 76 have worn off (or become undetectable). FIG. 12C shows the remaining face, or outer surface, 36 of the exemplary wear portion 20 and the remaining visible depth gauges 76 of the material release tracker 50 at that time, which correspond with Row 3 of the material release converter 90. FIG. 12D is an exploded view of the wear progression of the exemplary center depth gauge 76a in the configuration 60 to also illustrate the loss of wear material.

Table D is another variation, or embodiment, of a material release converter 90 for the same exemplary material release tracker 50 discussed above with respect to Table C, but including a different assortment of wear information and column headings.

TABLE D

Material Release Converter (90)

| What Do You See | Material Discharge Rate | Your Nutrient Output |
|---|---|---|
| ... | 0% | 0.00 g |
| ... | 10% | 6.90 g |
| ... | 20% | 13.80 g |
| ... | 30% | 20.70 g |
| ... | 40% | 27.60 g |
| ... | 50% | 34.50 g |

Figure 13:
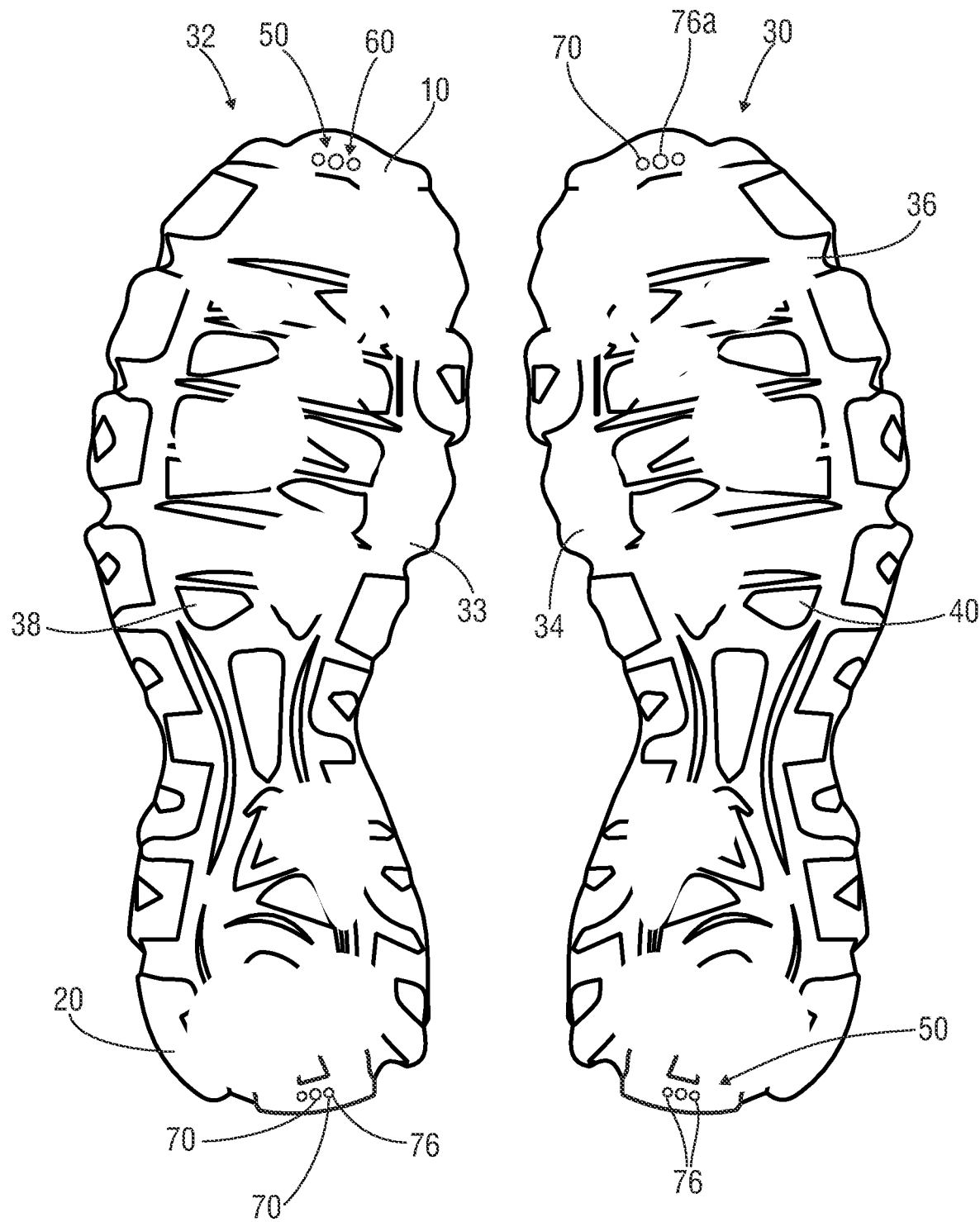
FIG. 13 is a bottom view of the exemplary shoes shown in FIG. 1A after some wear thereto.

For another example, FIG. 13 shows the exemplary shoes 32 of FIG. 1A after some wear at a point in time during the life of the shoes 32. In this example, each material release tracker 50 has worn down so that only the three illustrated depth gauges 76 remain visible. This same "3-cavity" pattern 60 can be seen in exemplary Tables C and is reproduced below as Table E. Thus, at this point, the exemplary pair of shoes 32 have lost an estimated total thickness loss of about 2.01 mm of regenerative wear material 10 (or 30% of total thickness lost, as per Table D), equating to an estimated 20.70 g of total nutrient output.

TABLE E

| Visual Configuration (60) | Net Thickness Loss (mm) | Net Nutrient Output (grams) |
|---|---|---|
| ... | 2.01 mm | 20.70 mm |

While the exemplary material release converters 90 of Tables C & D provide desired wear information for a pair of items 30 based upon material release information from one material release tracker 50 from one item 30 (e.g., FIGS. 1A-C), other embodiments may provide wear information based upon material release information from multiple material release trackers 50 on any number of items 30. This may be desirable to improve the accuracy of the wear information and/or for any other purpose. In theory, generally the more material release information used to arrive at wear information, the more closely the wear information may correlate to actual wear to the wear portion(s) 20. For example, the material release converter 90 of Table F provides wear information based upon an average of material release information from multiple material release trackers 50 from one among a pair of items 30. The illustrated material release converter 90 reflects exemplary wear information for a pair of items 30 (e.g., FIGS. 1A-C) based upon averaging the visible, or otherwise detectable, configurations 60 of material discharge elements 70 of three of the exemplary material release trackers 50, such as at the three locations on the wear portion 20 shown in FIG. 6A.

Figure 6A:
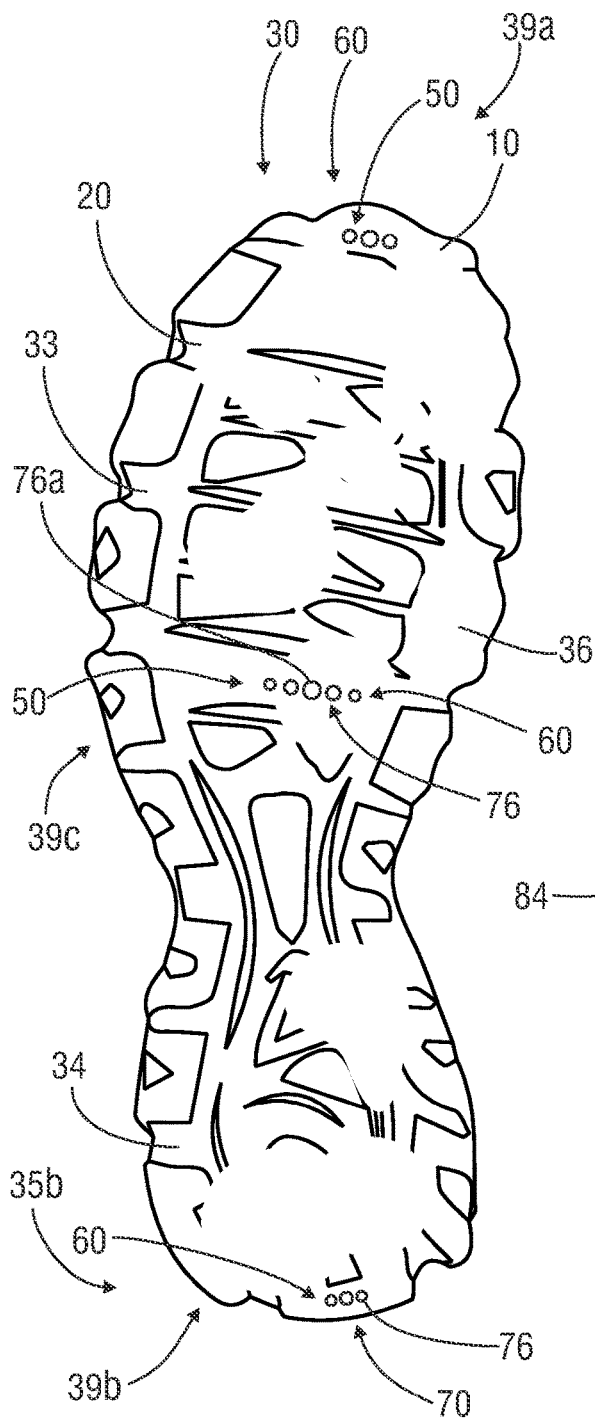
FIG. 6A is a bottom view of one of the exemplary shoes shown in FIG. 1A, but having three exemplary material release trackers after some wear to its wear portion in accordance with one or more embodiments of the present disclosure.
Figure 6B:
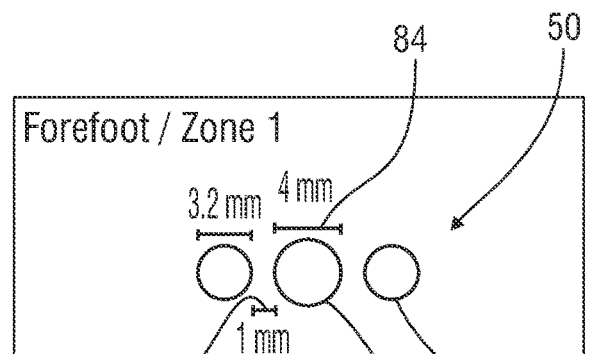
FIG. 6B is a front isolated view of the uppermost exemplary material release tracker shown in FIG. 6A and provides some exemplary dimensions of the illustrated depth gauges.
Figure 6C:
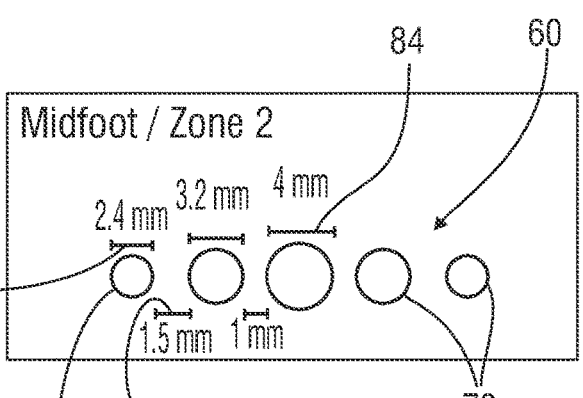
FIG. 6C is a front isolated view of the middle exemplary material release tracker shown in FIG. 6A and provides some exemplary dimensions of the illustrated depth gauges.
Figure 6D:
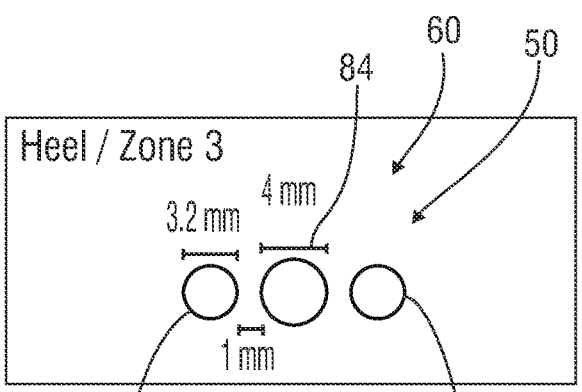
FIG. 6D is a front isolated view of the lowermost exemplary material release tracker shown in FIG. 6A and provides some exemplary dimensions of the illustrated depth gauges.

As mentioned above, the respective material release trackers 50 of FIGS. 6A-D are provided proximate to the upper and lower ends 39a, 39b and the midsection 39c of the wear portion 20. The illustrated wear portion 20 is constructed entirely of regenerative wear material 10 and each exemplary material release tracker 50 had the same original configuration 60 of material discharge features 70 shown in FIGS. 1A & 11A, namely a series of adjacent depth gauges 76 in the form of recessed cavities. However, FIG. 6A shows the item 30 after some wear to the wear portion 20. At this stage in the wear of the illustrated shoe 32, the configuration 60 of material discharge features 70 at the midfoot portion of the outsole 34 differs as compared to the configuration 60 of material release trackers 50 at the forefoot and heel.

TABLE F

Material Release Converter (90)

| Row | Visible Configuration (60) Forefoot-Zone 1 | Visible Configuration (60) Midfoot-Zone 2 | Visible Configuration (60) Heel-Zone 3 | Total # Depth Gauges | Net Thickness Loss (mm) | Net Nutrient Output (grams) |
|---|---|---|---|---|---|---|
| 1 | ∘∘∘◯◯◯∘∘ | ∘∘∘◯◯◯∘∘ | ∘∘∘◯◯◯∘∘ | 27 | 0 mm | 0 g |
| 2 | ∘◯◯◯∘∘ | ∘◯◯◯∘∘ | ∘◯◯◯∘∘ | 23 | 0.45 mm | 4.60 g |
| 3 | ◯◯◯◯∘ | ◯◯◯◯∘ | ◯◯◯◯∘ | 17 | 1.12 mm | 11.50 g |
| 4 | ◯◯◯ | ∘◯◯◯∘∘ | ◯◯◯ | 13 | 1.56 mm | 16.01 g |
| 5 | ◯◯◯ | ∘◯◯◯∘ | ◯◯◯ | 11 | 1.79 mm | 18.40 g |
| 6 | ◯ | ◯ | ◯ | 3 | 2.68 mm | 27.60 g |
| 7 | ▽ | ◯ | ▽ | 1 | 3.13 mm | 32.20 g |

Similarly as described and shown above with respect to Table C, the exemplary material release converter 90 of Table F, provides multiple options of configurations 60 of depth gauges 76 that remain visible on the item 30 at different times during the use and wear thereof. However, in this embodiment, each illustrated configuration option (Rows 1-7) includes three of the material release trackers 50 on the item 30 (e.g., FIG. 6A), and the wear information is based upon an average appearance, or status, of all three material release trackers 50. In this example, the total estimated thickness loss of regenerative wear material 10 across the wear portions 20 of both items 30 and associated nutrient output are calculated from an average of the three configurations 60 of depth gauges 76 on one item 30. Thus, at different stages (e.g., any time) during the use or life of the item 30, the visible configurations 60 of three exemplary material release trackers 50 can be matched and referenced to one of the discharge configuration options (Rows 1-7 and so on) in the exemplary material release converter 90 to provide the desired wear information (e.g., approximate net thickness loss, nutrient output, material discharges rate, etc.). For example, the illustrated configuration 60 of the material release trackers 50 of the item 30 in FIGS. 6A-D matches with Row 5 of the material release converter 90 of Table F, where the approximate total thickness loss across the pair of items 30 is 1.79 mm and the approximate total nutrient output is 18.40 g. However, other embodiments of material release converters 90 may provide wear information based upon material release information from any number of material release trackers 50 (e.g., 1, 2, 3, 4, 5, etc.) on one item 30 or on any number of multiple (e.g., similar, identical or differing) items 30.

In another independent aspect of the present disclosure, when included, the material release converter 90 may be provided to, or accessible by, any desired persons or entities, such as users, operators, supervisors, OEMs or vendors of the item 30, industry and regulatory organizations, clubs and other groups, databases, neural networks, artificial intelligence, any other entities or a combination thereof.

Likewise, the material release converter 90 may be provided in any suitable manner or medium. For example, the material release converter 90 can be provided on one or more wallet cards, refrigerator magnets, drink coasters, koozies, product hang tags and the like, or any combination thereof. In some instances, the material release converter 90 can be integral with, or provided in, or on, the item 30 or material release tracker 50. For example, the material release converter 90 can be printed on, or sewn or imbedded into the item 30 (e.g., the top fabric heel area of a shoe insole or instep area visible from above looking inside the shoe).

In various embodiments, the material release converter 90 can be provided on or made accessible via computer hardware, software, database(s), with interactive electronic or computerized tools, hosted on an OEM or other party's website or in a smartphone app, smart watch app or activity tracking device or app, and the like. For example, the material release converter 90 or wear information therefrom can be incorporated into wearable and/or other activity monitoring technology (e.g., smart watch, eyewear, GPS device). If desired, the wear information therefrom can be provided as an activity metric (e.g., along with time and/or geographic location data, steps, miles ran, calories expended, etc.) and/or stored over time, such as to accumulate larger data sets for the user or other party to see overall environmental footprints, wear pattern analysis, geographical deposit zones, etc.

In some embodiment, the wear information can be posted, maintained, tracked, evaluated (e.g., via computer software, neural networks or artificial intelligence) for any desired purpose, such as to aid in the custom design of the item 30 for the particular user, evaluating and/or potentially modifying the design or use of the item 30, assisting in developing new items 30, modifying the user's behavior/operations, evaluating the environmental impact from use of the item 30 (e.g., in large scales), for any other purpose(s) or a combination thereof.

In various embodiments, the material release tracker(s) 50 can be measured, viewed, matched or evaluated and/or the corresponding wear information provided and/or recorded at any time, on a scheduled basis, upon request or on-demand. For example, the material release tracker(s) 50, item 30, material release converter 90, related components (e.g., computer software) or a combination thereof can be configured to provide and record wear information in real-time on a continuing basis, or at any specific time. If desired, the material release tracker(s) 50, item 30, material release converter 90 or a combination thereof may be automated, electronic or computerized, electronically interconnected (e.g., via transmitter and receiver, RFID, QR Code and similar technology, wireless devices) to provide any desired capabilities. Some example uses of electronic components that can be used in connection with items 30 having certain embodiments of the regenerative wear material 10 and/or material release tracker(s) 50 are disclosed in U.S. Pat. No. 6,578,291 to Hirsch et al, issued on Jun. 17, 2003 and entitled "Shoe Wear Indicator", PCT App No PCT/US2006/005564 entitled "Tire Tread Wear Sensor System", filed on Feb. 17, 2006 by Motorola, Inc and published under WO 2006/098840 on Sep. 21, 2006 and U.S. Patent Application Publication Numbers 2016/0219972 to Davies and 2017/0258173 to Johnson, the entire contents of which are hereby incorporated by reference herein.

If desired, material discharge software (e.g., a smart phone app) may be used with one or more devices (e.g., smart phone, smart watch, tablet, etc.) to photograph, scan, sense or otherwise view or record the material release tracker 50 and, if desired, serve as or generate a material release converter 90 or otherwise provide wear information to the desired recipients (e.g., at any time, in real-time, on-demand). For example, a camera, scanner, sensor or other technology may be used. In some embodiments, the material discharge software may correlate the material release tracker(s) 50, wear pattern on the item 30 and/or associated wear information to use-abnormalities (e.g., exaggerated pronation or supination during use of footwear, potential injury, imbalance of vehicle or equipment during operation, equipment (e.g., elastomeric or metal) fatigue or failure, misuse or abuse of or damage to equipment) or corresponding potential responsive measures (modifications to footwear, repair or predictive, preventative or responsive maintenance of equipment, etc.).

Any of the components described above or shown in the appended figures may be automated or electronically or remotely controlled, such as with a computer-based controller, artificial intelligence, computer software and circuits, IoT, robotics and otherwise. When included, the material release tracker(s) 50 and/or material release converter 90 may be fully or partially autonomous or self-controlled. For example, the material release tracker(s) 50 and material release converter 90 may be communicably connected or electronically controlled with wired and/or wireless communications. If desired, monitoring of the material release tracker(s) 50 may be remotely managed in real-time via any device (smart phone, laptop, etc.) through one or more networks, with the use of software, AI, IoT technology or a combination thereof.

Figure 14:
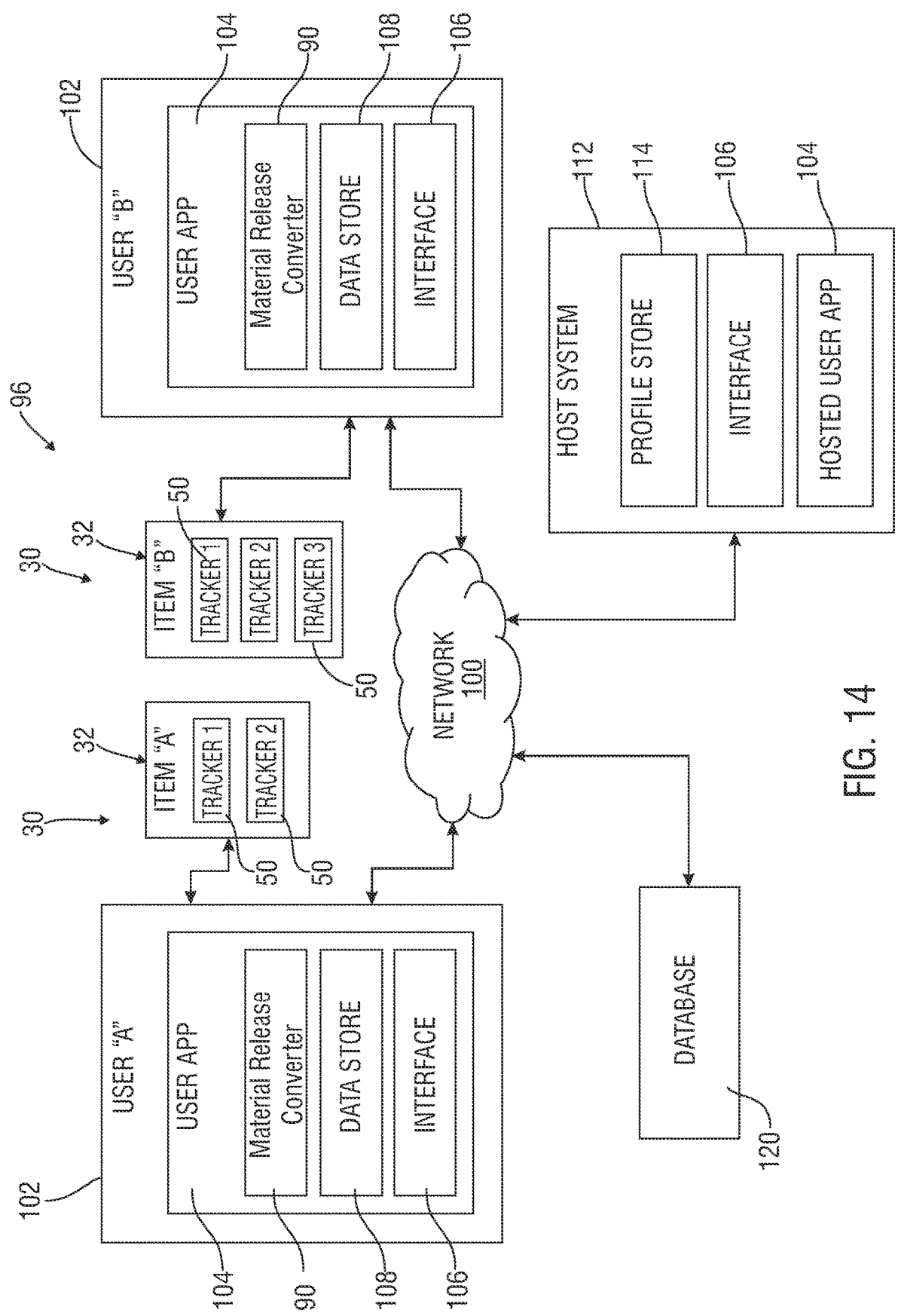
FIG. 14 depicts an example network diagram presented in accordance with one or more embodiments of the present disclosure.

In FIG. 14, an example network diagram 96 is presented in accordance with one or more embodiments. The network diagram 96 includes one or more client devices 102 communicably connected to one or more items 30 and at least one host system 112 across a network 100. The network 100 may include one or more different types of networks, such as wired or wireless networks, wide area networks, local area networks, short range networks, and the like. Although the various components and modules in the network diagram 96 are presented in a particular configuration, it should be understood that in alternative embodiments, the various components and modules can be differently distributed across the network diagram 96. Further, no part of this disclosure is limited to or by the type of client device 102, items 30, host systems 112 or other components of the network 100, except and only to the extent as may be expressly specified otherwise in any particular claims hereof and only for such claims and other claims depending therefrom.

The illustrated network 100 includes exemplary first and second client devices 102 of Users "A" and "B" (e.g., a user or operator of one or more items 30, supervisor, industry or government agency, OEM, vendor, etc.) in which one or more user applications 104 are stored or can be accessed. The network can include any number of additional client devices 102. In various embodiments, the client device 102 may be an electronic device configured to run the user application 104, and may include one or more computing devices, such as a mobile device, laptop computer, desktop computer, tablet device, wearable device, and the like.

The user app 104 may have any desired features and capabilities. In some embodiments, the user app 104 may be configured to sense or read (e.g., scan, photograph), or interact with, one or more material release trackers 50 associated with one or more items 30, read or determine material release information and/or wear information associated therewith, generate data, request data (e.g., from the host system 112, one or more databases 120 or other location), or a combination thereof. The user app 104 may provide data to the user (e.g., via a user interface 106), such as wear information associated with particular material release trackers 50 or items 30, prior wear information, comparison or historical wear information data, average wear information data, future predictive wear information data and so on. If desired, the user app 104 may manage data corresponding to the material release trackers 50 or items 30, such as by compiling and/or storing the data in one or more databases, or data structures, 108 located on one or more persistent storage devices within the client device 102 and/or communicably coupled to client device 102, such as external memory devices 120, cloud storage, and the like.

Still referring to FIG. 14, the exemplary network diagram 96 also includes a host system 112, which may include one or more servers or other computing devices, or some combination thereof. In some embodiments, the host system 112 includes, or has access to, a profile store 114 having one or more data structures containing information relating to the items 30 and/or users of the user apps 104 across various devices. For example, the profile store 114 may include information identifying one or more users and items 30 associated therewith and/or more complex information, such as user profiles, user preferences, user wear patterns, device wear patterns, and the like. When included, the profile store 114 may be stored on one or more hardware storage devices either within a server or other device of the host system 112, or may be accessed from elsewhere across network 100, such as in cloud storage. However, the network 100 may have any different or additional components, features and capabilities.

In some embodiments, a method of use of the material release tracker(s) 50 includes viewing, sensing, scanning, photographing or otherwise transmitting material release information (e.g., the detectable configuration(s) 60 of material discharge features 70) from the material release tracker(s) 50 to software, such as the user app 104. The exemplary user app 104 may correlate the present configuration(s) 60 of material discharge elements 70 to the desired wear information (e.g., nutrient output score, volume of wear material shedded, etc.) and provides such wear information to the user and/or any other desired recipients or destinations.

One exemplary method of use of the material release trackers 50 of various embodiments includes manually, electronically or otherwise viewing, detecting or receiving material release information from one or more material release trackers 50 on one or more items 30 and providing or determining the desired associated wear information. For example, the visible or otherwise detectable configuration 60 of material discharge features 70 of the material release tracker(s) 50 may be matched with a corresponding configuration 60 in an exemplary material release converter 90, which then provides the associated wear information. For another example, the material release converter 90 may calculate or determine (e.g., in real-time or on-the-fly) the desired wear information based upon the appearance (or other material release information) of the tracker(s) 50. The exemplary material release converter 90 then provides the desired wear information.

Figure 15:
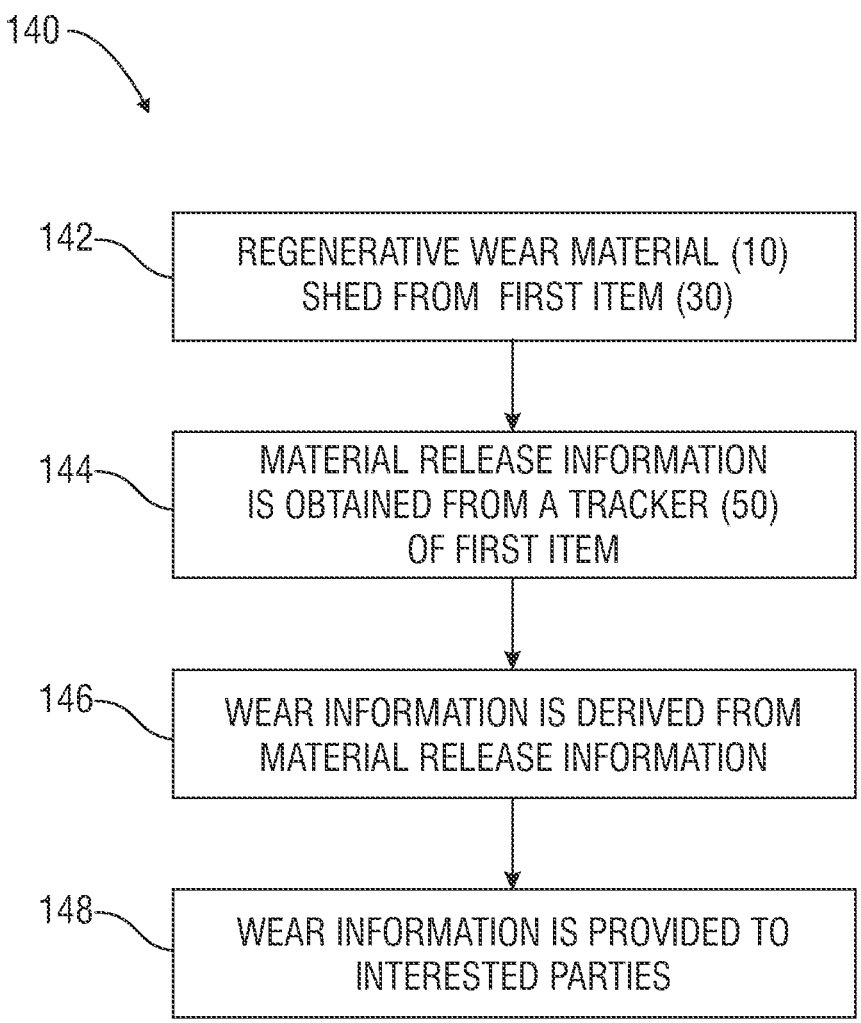
FIG. 15 shows a flowchart of an exemplary method of using one or more material release trackers of an item and obtaining wear information in accordance with one or more embodiments of the present disclosure.

FIG. 15 shows a flowchart 140 of an exemplary method of using one or more material release trackers 50 of an item 30 (e.g., see FIG. 1A) having a wear portion 30 constructed of regenerative wear material 10 according to one or more embodiments. All of the details of the embodiments of FIGS. 1A-14 are incorporated by reference herein. While the particular contents of this flow diagram 140 are used only to exemplify certain embodiments, any of the various acts or components depicted in the flow diagram 140 may be omitted, or the acts or components may be performed in a different order, or even concurrently. In addition, other embodiments may include additional acts or components not depicted as part of the flow diagram 140. Further, the various acts may be described as being performed by particular devices for purposes of explanation, but should not be considered limited to those devices.

The exemplary flowchart 140 begins at block 142, where regenerative wear material 10 is abraded or shed from the wear portion 20 of a first item 30 (see e.g., FIG. 2) during use of the item 30. At block 144, material release information is obtained from a first material release tracker 50 of the item 30. In some embodiments, this may be accomplished, for example, by a person viewing the tracker 50, or with the use of computer software and/or one or more devices that scans, photographs, image, read or electronically communicates (e.g., via wireless network) with the tracker 50 or item 30. At block 146, wear information is derived from the material release information. This may be done with the use of a material release converter 90 or computer software, any suitable device or other methods. At block 148, the wear information is shared with or provided to any interested parties, such as the user of the item 30, OEM, vendor, government or trade organizations, AI, IoT, neural networks, etc. for any desired purposes.

In many embodiments, blocks 142-148 of the flowchart 140 can be repeated at any desired time with respect to the first material release tracker 50 of the first item 30 and/or additional material release trackers 50 of the first item 30 or any number of other items 30. The resulting wear information can be complied, compared, recorded and used as desired, such as described in other parts of this patent.

With respect to all of the discussions herein and all parts of this patent, it should be understood that the wear information provided by or based upon one or more material release trackers 50, such as the amount of regenerative wear material 10 shedded from an item 30 and the amount of corresponding nutrient released therefrom, should be considered estimations or approximations only and could have a wide margin of error from the actual amounts (or other measure). This could be due to any variety of factors, such as the non-uniform distribution or dispersion of nutrients in the regenerative wear material 10 provided in the wear portion 20 of the item 30, the limited data provided by the material release trackers 50 (e.g., reflecting wear to particular locations of the wear portion 20), variations in the nature of the ground, or other, surfaces contacted with the wear portion 20, variations and unpredictability of user behavior (e.g., such as the in individual human movements, unique foot impact patterns, stride/gait analysis for footwear 32), any other factors or a combination thereof. For example, there may not always be an exact quantity of nutrients per square inch in the regenerative wear material 10. In many instances, the mixing process may not consistently or may randomly disperse the nutrients throughout a compound matrix. Thus, in some embodiments, similar to the food industry where nutrients per serving are based on an average and each individual serving might vary, the nutrient output or content (or other wear information) associated with any particular wear portion 20 constructed with regenerative wear material 10, and provided by the material release converter 90, may be based on averages. Accordingly, while there may be embodiments or instances where the material release information and/or wear information is perfectly or near-perfectly accurate or exact, the material release tracker 50 and wear information should be considered as having a tolerance, or margin of error, and providing general predictions, or estimates, based upon limited information.

Various embodiments of the regenerative wear material 10, material release tracker 50 and material release converter 90, as well as the items 30 and wear portions 20 with which they are used, can incorporate any of the features, processes or other disclosures of all of the documents referenced above and incorporated by reference herein and the following additional exemplary documents, Korean Pat App KR1020150014600A entitled "Method of Measuring Tread Abrasion of Tire and Apparatus Thereof", filed on Jan. 29, 2015 and published under Korea Pub No. KR101534259B1 on Jul. 6, 2015, China Patent App No. CN2012103758271A entitled "Method for Marking and Reading Deep Abrasion of Tire Pattern" and filed on Oct. 8, 2012, assigned to Double Coin Group (Rugao) Tyre Co. Ltd. and published under China Patent Pub. No. CN102837566A on Dec. 26, 2012, as well as the contents of https://www.doctorsofrunning.com/2017/06/footwear-science-outsole-wear-patterns.html, the entire contents of which are hereby incorporated by reference herein.

It should be noted that the particular values presented in the Tables, figures and other parts of this patent apply for one or more particular embodiments, depend upon many different variables (e.g., strength and formulation of, and ingredients in, the subject wear material, type of material discharge feature 70) and are thus exemplary only and not limiting upon the present disclosure, except and only to the extent as may be expressly specified otherwise in any particular claims hereof and only for such claims and other claims depending therefrom. It should also be noted that the form, quantity, size, configuration, construction, precise location, orientation and operation of the components mentioned above are not limited or limiting upon the present disclosure or any claims of any patents related hereto, unless and only to the extent as may be expressly provided in a particular claim and only for that claim and claims depending therefrom.

Each embodiment described herein or shown in the appended figures and any other embodiments of the regenerative wear material 10, material release tracker 50 and material release converter 90 may have any one or more of the features described herein, shown in the appended figures or which are apparent therefrom. Moreover, the exemplary embodiments do not require all of the features presented herein or shown in the appended figures for such embodiments or other embodiments. Accordingly, all of the above features are not required for every, or any particular, embodiments of the regenerative wear material 10, material release tracker 50 and material release converter 90 and other features may be used. Further, every embodiment does not require the use of regenerative wear material 10, material release trackers 50 and material release converters 90, which are believed to be independently patentable inventions, and can thus include any one or more thereof.

Preferred embodiments of the present disclosure thus offer advantages over the prior art and are well adapted to carry out one or more of the objects of this disclosure. However, the present invention does not require each of the components and acts described above and is in no way limited to the above-described embodiments and methods of operation. Any one or more of the above components, features, aspects, capabilities and processes may be employed in any suitable configuration without inclusion of other such components, capabilities, aspects, features and processes. Thus, embodiments of the present disclosure may have any one or more of the features described or shown in this patent. Moreover, the present invention includes additional features, capabilities, functions, methods, uses and applications that have not been specifically addressed herein but are, or will become, apparent from the description herein, the appended drawings and claims.

The methods that may be described above, claimed herein or are apparent from this patent and any other methods which may fall within the scope thereof can be performed in any desired or suitable order and are not necessarily limited to any sequence described herein or as may be listed in any appended claims. Further, the methods of various embodiments of the present disclosure may include additional acts beyond those mentioned herein and do not necessarily require use of the particular embodiments shown and described herein, but are equally applicable with any other suitable structure, form and configuration of components.

While exemplary embodiments have been shown and described, many variations, modifications and/or changes of the system, apparatus, articles of manufacture and methods of the present disclosure, such as in the features, components, details of construction and operation and arrangements thereof and the manufacture, assembly and use thereof, are possible, contemplated by the present patentee, within the scope of any appended claims, and may be made and used by one of ordinary skill in the art without departing from the spirit, teachings and scope of this disclosure and any appended claims. Thus, all matter herein set forth or shown in the accompanying drawings should be interpreted as illustrative and the scope of this disclosure and any appended claims should not be limited to the embodiments described or shown herein.

The invention claimed is:

1. A system for determining an approximate amount of nutrients released from the wear portion of an item that abrades due to friction during use of the item, the system comprising:

regenerative wear material provided in the wear portion of the item, the regenerative wear material including nutrients; and a material release tracker associated with the wear portion, the material release tracker being configured to provide material release information based upon abrasive wear to the wear portion from use of the item, the material release information being used to estimate the amount of nutrients released from regenerative wear material shedded from the wear portion of the item.

2. The system of claim 1 wherein the material release tracker is provided in the item and the material release information includes a visible configuration of material discharge features associated with the wear portion of the item, wherein the visible configuration of material discharge features changes based upon wear to the wear portion, each different configuration corresponding with a different estimated amount of nutrients released from the wear portion.

3. The system of claim 1 further including at least two material release trackers provided at different respective locations in or on the item, wherein the estimated amount of nutrients released from the wear portion of the item is based upon an average of material release information from at least two material release trackers.

4. The system of claim 1 further including at least one material release converter configured to provide the estimated amount of nutrients released from the wear portion of the item based upon material release information from the material release tracker.

5. The system of claim 4 wherein the material release converter is integral with the item or material release tracker, or is provided in, or on, the item.

6. The system of claim 4 wherein the item is a shoe and the wear portion is an outsole of the shoe.

7. The system of claim 4 wherein the item is at least one among a wheel, ski pole and handlebar of a bicycle or motorcycle, the respective wear portions being the tire of the wheel, traction pad or grip of the ski pole and grip of the handlebar.

8. The system of claim 4 wherein the material release converter is provided in computer software.

9. The system of claim 1 further including a non-transitory computer readable medium comprising computer readable code executable by one or more processors to read the material release tracker and determine and present the estimated amount of nutrients released from the wear portion of the item based upon the material release tracker.

10. A system for determining an approximate total amount of nutrients released from the wear portion of an item at different times during use of the item based upon wear to the wear portion, the wear portion being constructed at least partially of regenerative wear material that includes nutrients, the system comprising:

a material release tracker provided on or in the item and associated with the wear portion; and a material release converter indicating an estimated total amount of nutrients released from the wear portion of the item that corresponds with an estimated amount of wear to the wear portion and is based upon the material release tracker.

11. The system of claim 10 wherein the material release tracker includes a detectable configuration of material discharge features associated with the wear portion of the item, wherein the detectable configuration of material discharge features will change at different times during at least part of the life of the item based upon wear to the wear portion, each different configuration corresponding with a different estimated total amount of regenerative wear material discharged from wear portion, further wherein the material release converter is configured to provide a different estimated total amount of nutrients released from the wear portion for each different configuration of material discharge features.

12. The system of claim 11 wherein the material release converter is provided in a non-transitory computer readable medium comprising computer readable code executable by one or more processors to determine the estimated total amount of nutrients released from the wear portion of the item based upon the detectable configuration of material discharge features.

13. The system of claim 10 wherein the wear portion of the item has a thickness that decreases during wear to the wear portion, further wherein the material release tracker includes a plurality of differing material discharge features, each material discharge feature being associated with a different thickness of the wear portion.

14. The system of claim 13 wherein the wear portion of the item includes a wear face and the material discharge features include multiple different-sized cavities extending inwardly into the wear portion from the wear face, each different-sized cavity including a base provided at a different respective depth in the wear portion that corresponds with a distinct approximate total amount of regenerative wear material discharged from the wear portion at one or more points in time during use of the item.

15. The system of claim 14 wherein the material release converter includes a distinct estimated total amount of nutrients released from the wear portion corresponding to the depth of each respective different-sized cavity.

16. The system of claim 14 wherein after each respective different-sized cavity disappears or is worn down to the base thereof due to wear to the wear portion, the material release converter is configured to provide a different estimated total amount of nutrients released from the wear portion.

17. The system of claim 14 wherein the depth of a first cavity is less than the depth of a second adjacent cavity, which is less than the depth of a third adjacent cavity and the first, second and third cavities are provided in a visible configuration that will change over time due to wear to the wear portion, whereby a different estimated total amount of nutrients released from the wear portion corresponds with each among a plurality of different variations of the visible configuration of the first, second and third cavities.

18. The system of claim 17 wherein a first variation of the visible configuration includes the second and third cavities, a second variation of the visible configuration includes only the third cavity and a third variation of the visible configuration includes no cavities, further wherein the first variation of the visible configuration corresponds with a first estimated total amount of nutrients released from the wear portion based upon the depth of the first cavity, the second variation of the visible configuration corresponds with a second estimated total amount of nutrients released from the wear portion based upon the depth of the second cavity and the third variation of the visible configuration corresponds with a third estimated total amount of nutrients released from the wear portion based upon the depth of the third cavity, whereby the first, second and third estimated total amounts of nutrients released each differing from one another.

19. The system of claim 10 wherein at least one among the material release tracker and material release converter is software-driven.

20. The system of claim 10 wherein at least one other item includes a wear portion constructed at least partially of regenerative wear material, whereby the material release information is used to estimate the amount of nutrients released from regenerative wear material shedded from the wear portion of the item and the wear portion of at least one other item.

21. A method of determining an approximate amount of nutrients output from the wear portion of an item at different times during the life of the item based upon wear to the wear portion with the use of a material release tracker that includes a visible configuration of multiple material discharge features associated with the wear portion, the wear portion including nutrients, the method comprising:
  the material release tracker displaying a first variation of the visible configuration of material discharge features at a first point in time during the life of the item;
  providing a first estimated total amount of nutrients output from the wear portion of the item based upon the first variation of the visible configuration of material discharge features;
  the material release tracker displaying a second variation of the visible configuration of material discharge features at a second point in time during the life of the item; and
  providing a second estimated total amount of nutrients output from the wear portion of the item based upon the second variation of the visible configuration of material discharge features, wherein the second point in time is chronologically after the first point in time and the second estimated total amount of nutrients output from the wear portion is greater than the first estimated total amount of nutrients output from the wear portion.

* * * * *